(12) United States Patent
Follis

(10) Patent No.: US 9,984,242 B2
(45) Date of Patent: May 29, 2018

(54) ATTESTATION FOR ELECTRONIC SIGNATURES

(71) Applicant: Adobe Systems Incorporated, San Jose, CA (US)

(72) Inventor: Benjamin David Follis, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 760 days.

(21) Appl. No.: 14/458,803

(22) Filed: Aug. 13, 2014

(65) Prior Publication Data

US 2016/0048696 A1 Feb. 18, 2016

(51) Int. Cl.
*G06F 21/62* (2013.01)
*G06Q 10/10* (2012.01)
*G06F 21/64* (2013.01)

(52) U.S. Cl.
CPC ........ *G06F 21/6209* (2013.01); *G06F 21/645* (2013.01); *G06Q 10/103* (2013.01)

(58) Field of Classification Search
None
See application file for complete search history.

(56) References Cited

U.S. PATENT DOCUMENTS

| 7,552,175 B2* | 6/2009 | Luo | H04L 12/1822 709/205 |
| 2003/0078880 A1* | 4/2003 | Alley | G06F 21/645 705/38 |
| 2008/0072334 A1* | 3/2008 | Bailey | G06Q 10/10 726/28 |
| 2008/0209516 A1* | 8/2008 | Nassiri | G06F 21/32 726/3 |

* cited by examiner

*Primary Examiner* — Steven S Kim
*Assistant Examiner* — Kristin D Sandoval
(74) *Attorney, Agent, or Firm* — Kilpatrick Townsend & Stockton LLP

(57) ABSTRACT

Techniques for generating a document according to attestation requirements are provided. A method determines attestation requirements for electronically signing an electronic document. The method modifies the document based in part on the requirements, and then provides the modified document to users requested to electronically sign the document, wherein the users are only permitted to electronically sign the document in circumstances satisfying the requirements. An electronic signature service can generate a document whose signing needs to be witnessed and/or recorded according to attestation requirements. The document may be associated with number of signers. The electronic signature service may determine one or more witnesses of the signers and may determine applicable attestation requirements based on the witnesses, the signers, and the document. Further, the electronic signature service may record proceedings associated with collecting signatures for the document and record and/or pause a workflow associated with the document to meet the applicable requirements.

19 Claims, 9 Drawing Sheets

ATTESTATION FOR ELECTRONIC SIGNATURES

TECHNICAL FIELD

This disclosure relates generally to computer-implemented methods and systems for generating documents and recording signature proceedings according to attestation requirements and other document execution requirements.

BACKGROUND

Users may operate computing devices and use computing services, such as an electronic signature service, to exchange and electronically sign documents such as contracts. In many situations, the users may be members of different organizations or located in multiple jurisdictions that have different attestation requirements around what constitutes binding signatures in a contract or agreement. In some situations, users in different organizations, such as different businesses, groups, or departments, may be subject to different attestation requirements. Many organizations need to collect signatures from members in geographically disparate locations and also need to witness the signatures taking place in real time. Additionally, the organizations may require a record of signatures and information supporting the signatures. For example, a business may have an internal notarization process, however the business may have office locations that lack a notary. In this example, an employee of the business may be required to sign a document that requires a notarized or witnessed signature, but that employee may work in an office without a notary.

Also, for example, a user may be located in the United States of America and another user may be located in the European Union. In comparison, the laws of certain jurisdictions in the United States of America may require that an electronic signature be created in the presence of a witness, such as a notary, whereas the laws of the European Union may only require a digital signature issued by a European agency. As such, for the electronic signatures of the users to be binding in both jurisdictions, electronic signatures on the contract may need to be witnessed to meet the different jurisdictional requirements.

Although the computing services allow the users to exchange and electronically sign the contract, the computing services do not automatically record the contract execution proceedings or provide for witnessing of signatures in order to meet the different organizational and jurisdictional attestation requirements. Instead, it is necessary for the users to know the requirements and ensure that electronic signatures for a contract are witnessed and/or recorded as needed to meet these requirements. For example, the contract may need to be manually modified to include proper electronic signature fields for a witness (e.g., a notary) that meet the different organizational or jurisdictional requirements. However, it may be incumbent on the users to arrange for the presence of the witness and modify the contract to and/or record the execution proceedings. Further, even if known, the users may need to invest substantial time and resources to draft the contract to account for witness attestation fields and alter and/or record the contract execution proceedings.

SUMMARY

One exemplary embodiment involves determining, by a computing service configured to facilitate electronic signatures for electronic documents, one or more attestation requirements for electronically signing an electronic document. According to this embodiment, the computing service modifies the electronic document based at least in part on the one or more requirements. Next, the embodiment provides the modified electronic document to one or more users requested to electronically sign the document. In this embodiment, the one or more users are only permitted to electronically sign the document in circumstances satisfying the one or more requirements.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
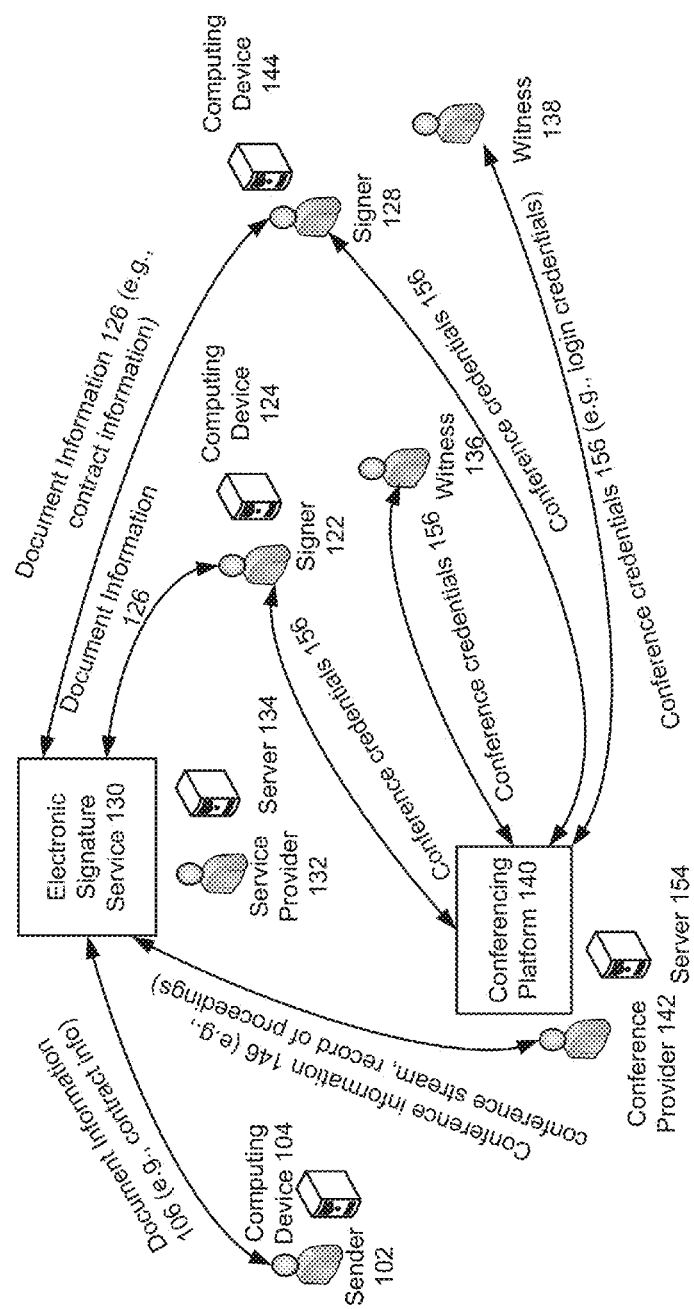
FIG. 1 is a block diagram illustrating communication flows between entities and computing devices in a computing environment for generating a document that meets attestation requirements, in accordance with embodiments.

Generally, the embodiments described herein are directed to, among other things, allowing users to generate documents according to attestation requirements and other requirements. For example, as stipulated by an attestation requirement, an attestation clause can be appended to a document to be signed so that the signatures in the executed document can be verified. For example, a computing service, such as an electronic signature service, may be implemented to modify a document to automatically meet various organizational and jurisdictional requirements.

Various organizations require an attestation that a document was actually signed by a person whose electronic signature is in the document. For some organizations, an attestation requirement akin to using a notary may be required. Other organizations may have less strict attestation requirements depending on the type of document and the signer. For example, when an organization requests that a person electronically signs an employment contract, a witness from the organization's human resources department may be required to witness the signature to provide actual proof that it is the employee sitting there in front of the human resources representative signing the employment contract. Further, for example, some organizations may require that the actual physical act of signing a document and the proceedings and environment around the act of signing are recorded. For instance, if there are ongoing contract negotiations, the parties to the contract might want to have them recorded by a conferencing solution or platform along with the contract to provide context and/or proof that the agreed-upon contract terms were present in the executed contract.

In certain embodiments, a conferencing platform configured to stream video, audio, and uploaded information can also monitor and record users' screens as the users are signing a document. For example, a conferencing platform can monitor a user's web cam, and can use monitored information about a user's participation in a conference to provide context information surrounding the execution of the document during the conference. In some embodiments, context information such as, but not limited to chat channels, spoken words, photographs, and video can be recorded in order to fulfill attestation requirements. Embodiments use a conference platform to monitor and record document signing (e.g., document execution) proceedings and context so that an electronic signature service can coordinate with the platform to control the document signing experience and signing work flow based on what is happening in an ongoing conference. In embodiments, attestation requirements for 'witnessing' signing of a document can include a requirement that the entire document signing proceedings are recorded. According to one such embodiment, there might not be a designated witness, or an actual person coordinating the document signing process or workflow. Instead, the conference platform can automatically halt signing of a document in response to determining that a required conference attendee or participant has dropped out from the conference (e.g., a signer has disconnected from the conference). According to this embodiment, the conference platform can temporarily halt the document signing workflow until the required participant rejoins the conference. In this way, a document signing workflow that adheres to attestation requirements can be fully automated.

According to embodiments, one or more users and witnesses requested to sign a document can join a conference provided by a conference provider. The conference provider can initiate a recording of the conference, and associate the conference with the particular document. In embodiments, this association can be done a priori or live during the conference by an administrator. In accordance with attestation requirements, the electronic signature service may not allow a user or witness to sign the document until all signers and witnesses are present at the conference. In this way, embodiments provide for coordinated signing and attestation of documents. For instance, the conference provider can use a conferencing platform to host a multi-media conference where a document is to be signed and witnessed by multiple users that are in different physical locations. In this example, after the required users log in to the conference, the users can commence signing the document at a designated time (or within a designated time frame). The conference proceedings can be recorded by the conferencing platform, streamed to witnesses, and subsequently provided to the electronic signature service. The electronic signature service can use the recorded proceedings to ensure that attestation requirements are met by determining that the required participants were present at the conference. For example, the electronic signature service can determine, based on the recorded proceedings, that all required signers and witnesses were logged into the conference as the document was being signed. In additional or alternative embodiments, the electronic signature service can optionally enforce attestation requirements stipulating that a required subset of participants are present when a document is signed without requiring all participants to be connected to the conference as the document is signed.

Embodiments disclosed herein facilitate collecting signatures for an electronic document by setting the document to have a signable state in response to determining that required participants are present in a conference. According to this embodiment, when the document is signed, the conference proceedings are transferred from the conferencing platform to the electronic signature service, and the recorded proceedings become part of the audit information of the document. Such proceedings can be viewable and serve as evidence or proof that attests that the document was actually signed by the signatories whose electronic signatures are included in the document. One embodiment prevents or blocks execution of a document until required users such as signers and witnesses are connected to a conference.

Organizations and users located in various jurisdictions may desire to enter into an agreement or contract that is binding in the jurisdictions. To do so, the users can use a computing service such as an electronic signature service to generate a document that meets corresponding jurisdictional requirements. The computing service may receive the document from one of the users or may assist the users in creating the document. Further, the computing service may access pre-stored jurisdictional requirements to determine the attestation requirements that apply to the jurisdictions where the users are located. To ensure compliance with the applicable attestation requirements, the computing service may compare the document to the requirements and may modify the document, as necessary. Once the applicable requirements are met, the computing service may present the compliant document to the users. In turn, the users may electronically sign the document.

As such, the computing service may use the locations of the users to determine which jurisdictions the document should be recognized in and what attestation requirements apply to the jurisdictions. The computing service may automatically modify the document to meet the corresponding jurisdictional requirements. For example, if a contract signature by a party to the contract must be witnessed by a notary, the service can determine the corresponding attestation requirements for a notary in the party's jurisdiction. In this way, the users need not know the jurisdictional attestation requirements of the document and need not upload an already compliant document to the computing service. Instead, the effort of the users may be minimized because the computing service may automatically ensure that the contract meets the jurisdictional requirements.

In certain embodiments, a computing service executed by a computing device automatically modifies a document, such as, for example, a contract, to meet various attestation requirements, including real time witnessing requirements and recording requirements. An electronic signature service has full control of when a document becomes signable. Furthermore, the service may require arbitrary steps to be performed by parties to a contract before a signer is allowed to sign. For example, one such step may be that all parties must sign into a video conferencing session before a document such as a contract becomes signable. In another example, the service may require that a party to the video conference attests that another party has presented acceptable identification.

Methods and systems are disclosed that enable an organization to instruct an electronic signature service to allow or require real time proceedings of document signing, optionally designate a witness, have those instructions enforced, and be presented with a recording, such as, for example, a transcript of a video conference, of the signature process. In this way, the service enables a user to verify that actions surrounding the signing of a document are recorded and associated with the signed document. For example, a recording of the proceedings of a contract signing can be used to attest to the fact that the contract was actually executed by the parties to the contract.

Prior to sending a document for signature, a sender may instruct an electronic signature service to require real time 'witnessing' of the document's execution (e.g., a contract's signing), and optionally may provide a time at which the signers are supposed to sign the document. Upon receipt of such instruction, the electronic signature service can provide the signers (e.g., the signatories) with the information and credentials necessary to sign the document. The electronic signature service can also provide information and credentials to a video conferencing/collaboration provider associated with the service. The information provided can include, for example, a proposed time frame during which the document is to be signed. An example of a video conferencing/collaboration provider is a web conferencing platform such as Adobe® Connect™ from Adobe Systems, Incorporated.

In an embodiment, the electronic signature service can initially block signing of a document by any signers (e.g., parties to a contract and witnesses). Upon determining that all signers have 'logged in' or otherwise connected to the video conferencing provider, the conferencing provider can then notify the service, and provide to the service a real-time stream of the conference proceedings. When the service receives such notification and stream it will release the contact and allow signing to proceed. Upon completion of signing, the service can associate the conference proceedings with the signatures and make both available as part of the audit information of the document (e.g., the signed contract).

For example, the electronic signature service may determine attestation requirements for a document to be electronically signed by one or more users. The users can be parties to a contract (e.g., parties contractually bound upon execution of the contract) and witnesses. Based on the attestation requirements, the computing service may determine witness and audit requirements specific to the parties and applicable to the document to be signed and may determine if the document meets the requirements. If not, the computing service may automatically modify the document to meet the attestation requirements. Further, the computing service may present the contract, as modified, to the user for an electronic signature. In this way and without necessitating the user to know the requirements, the computing service may ensure that the presented contract meets the attestation requirements specific to the document being signed by the user.

In an embodiment, a conference provider providing a conference being used to sign a document can notify the electronic signature service of any signer leaving a conference. In response to receiving such a notification, the electronic signature service can suspend the signature process (i.e., the workflow) until all signers are present in the conference again. According to an embodiment where a document being signed is a contract, an entity not a party to the contract may be designated as a witness, and only that entity and a given signer need be present to initiate signing of the contract. In accordance with this embodiment, the witness may be allowed to impress an electronic seal or signature on the contract, but would not be bound by its terms. In another embodiment, wherein the electronic signature service may block signing of a document even when all required entities are present, unless a given entity performs a specified action. For example, the service may be configured to present to the witness a dialog confirming that all signers have presented acceptable identification. According to this embodiment, upon confirmation by the witness, the service would allow signing to proceed.

In certain embodiments, the signers of a document can provide information and attachments via a conferencing provider's mechanisms, and such supporting documentation is automatically attached to the document at time of signing.

According to embodiments, the conference provided by a conferencing provider may be auditory in nature, (e.g., a telephone conference), and certain confirmations and workflow actions can be performed by voice or touch-tone prompts. Examples of such actions can include, for example, entry of a touch tone passcode, a PIN, voice recognition of a signer or witness, dual-tone multi-frequency signaling (DTMF), and/or authentication based at least in part on a signer's previously registered phone number.

As used herein, a "computing service" refers to a service provided by a workflow or process flow executed on a computing device for providing various services to users. An example of a computing service is an electronic signature service, such as EchoSign® from Adobe Systems, Incorporated, configurable to facilitate the exchange of electronic documents between users and applications of electronic signatures to the electronic documents. The computing service may be implemented, in one embodiment, by software programs executed on one or more computing systems to carry out numerous workflow tasks. The computing service may also be implemented using computing hardware and/or firmware.

As used herein, an "electronic document" refers to a document that has an electronic format and that can be exchanged and signed by users. In an example, an electronic document can reflect or relate to an agreement between users such as a contract, an offer, a memorandum of understanding, a licensing agreement, a letter of intent, etc. Other examples of electronic documents include, without limitation, policy documents, minutes, notes, memoranda, cards, drawings, reports, lists, legal opinions, letters, etc. In general, the invention is not limited to any particular type of electronic document and is applicable to any type of electronic document that may require at least one electronic signature.

As used herein, a "workflow" refers to a series of actions that should or may be required to be performed in association with an electronic signature of an electronic document. In an example, a user may define a workflow that can be executed by an electronic signature service to facilitate an exchange of an electronic document between users and applications of electronic signatures to the electronic document. In this example, the user may identify the users, specify an order in which the users must apply their electronic signatures, indicate whether the electronic signature service can modify the electronic document or the workflow, request that a copy of the electronic document be stored on a certain server, and specify other type of information pertinent to the execution and handling of the electronic document.

As used herein, an "electronic signature" of a user refers to information that represents an assent of the user to content of an electronic document for which the electronic signature is provided. For example, an electronic signature may be a digital signature, electronic data representing a click-through response, a typed signature, a computer generated signature for a user, a scanned signature for a user, a faxed signature of a user, a voice recording, a finger swipe, a photo, a video, or other biometric reading of the user.

As used herein, an "attestation requirement" refers to a requirement to affirm or provide evidence of the correctness or validity of a signed document. An attestation requirement can refer to a requirement to witness the act of signing an electronic document, or to witness an event or workflow step associated with executing a document. An attestation requirement can stipulate that an audit trail or recording of a document's execution by one or more signatories be made available so as to demonstrate that the document was in fact signed by the signatories. When fulfilled, attestation requirements can provide evidence for proving the authenticity of electronic signatures in a document. Attestation requirements may be specific to an electronic document, a jurisdiction, an organization, and/or a user requested to sign an electronic document. In an example, jurisdictions, organizations (e.g., businesses), and statutes may define attestation requirements. The requirement may be legal and may render a compliant electronic document legally binding. Alternatively, the attestation requirement may be non-legal, such as a procedure or a policy of a company that may vary between divisions or groups of the company. One example of an attestation requirement is a requirement that an electronic signature be witnessed by a designated witness. The witness can be, for example, a notary or signing agent that attests to the identity of a signer of the document and witnesses the execution of the document by the signer. Another example of an attestation requirement is a requirement to append an attestation clause to a document to be signed. Attestation requirements can be enforced in order to validate the integrity and authenticity of electronic signatures in documents.

As used herein, an "electronic meeting" refers to a group of users coming together at either coordinated times or at a synchronized time, whereupon their presence is recorded and actions taken by the users are recorded to some extent. The presence of users at an electronic meeting and a recording of actions of the users can be used to attest to the users' participation in the meeting. An electronic meeting can comprise one or more electronic conference sessions where the participants' presence is either recognized, recorded, or identified. That is, an electronic meeting is something in which a user such as a signer or a witness can be present or not present in, and can be participating or not participating in.

Unless specifically stated differently, a "user" is interchangeably used herein to identify a user account of a signer or witness, a human user, or a software agent. Besides a human user who accesses, modifies, and signs electronic documents such as contracts, a software application or agent sometimes accesses and modifies electronic documents. The systems and methods disclosed herein can provide modified electronic documents, such as contracts, to signers and witnesses based on attestation requirements associated with both human users and software agents. Accordingly, unless specifically stated, the term "user" as used herein does not necessarily pertain to a human being.

As explained herein above, a computing service, such as an electronic signature service may be implemented to provide various services to users. The electronic signature service may allow a first user to specify content of a document, to identify a second user that should to agree to the content, and identify any organizations, jurisdictions, or locations where the document may be relevant. The electronic signature service may have access to attestation requirements applicable to each organization, jurisdiction, and location that is relevant to the document. The electronic signature service may also maintain such attestation requirements. In response to receiving input from the first user, the electronic signature service may determine the various relevant locations (e.g., the first location, the second location, and/or any other identified location), may generate a rule set that unifies attestation requirements associated with the various locations, and may apply the rule set to generate or update the document such that the document may meet the requirements. Once the document satisfies the requirements, the electronic signature service may present the document to and receive signatures from the first and second users.

To illustrate, the first user may be located in the United States of America and may be a sender of a contract, whereas the second user may be located in the European Union and may be a signer of the contract. The sender may identify that the contract should be also legally binding in Japan. To be legally binding in the United States of America, the contract may need to include a certain contractual statement (e.g., a positive assent statement) and the signing of the contract may need to be witnessed by a notary public. In comparison, to be legally binding in the European Union, the contract may need to include a certain signature field (e.g., a digital signature that uses a certificate issued by a national agency) and signatures in the contract may need to be witnessed by a civil law notary. Similarly, to be legally binding in Japan, the signing of the contract may need to meet a certain workflow and adhere to audit-related attestation requirements (e.g., a series of actions that may include, for instance, storing a copy of the contract and an audit trail of its signing at a local agency in Japan). The electronic signature service may maintain or have access to a database that stores these various attestation requirements.

The described legal requirements herein are for illustrative purposes and are used to exemplify that different jurisdictions can have different legal and other requirements applicable to a document and/or a workflow, such as to the associated form, structure, content, and signatures of the document and/or workflow.

In response to the sender specifying the terms of the document, the electronic signature service may determine that the document should be legally binding in three jurisdictions: the United States of America, the European Union, and Japan. As such, the electronic signature service may modify the document and/or the workflow to meet the attestation requirements of these three jurisdictions. For example, the electronic signature service may add the contractual statement to the document and update a signature field to accept a digital signature and to accept a signature of a notary. Subsequently, the electronic signature service may present the document to the sender and signer and may receive an electronic signature from the sender and a digital signature from the signer. In addition, the electronic signature service may execute the required flow including, for example, sending a copy of the signed document and an audit trail to the Japanese local agency.

As such, the electronic signature service may minimize the effort of the sender and/or signer to enter into a legally binding document. For example, the sender and/or signer need not be aware of the various attestation requirements, proceedings recordation requirements, and other requirements, and need not manually modify the document to meet these requirements. Instead, the electronic signature service may automatically generate or modify the document by determining the pertinent organizations and locations, and using the corresponding attestation requirements. These and other aspects of the present disclosure are further described herein below.

In the interest of clarity of explanation, various embodiments herein below describe users generating and signing a contract. However, the present disclosure is not limited to contractual documents. Instead, the embodiments similarly apply to any other types of electronic documents that may require at least one electronic signature, such as (but not limited to) offers, memorandums of understanding, letters of intent, policy documents, minutes, notes, memoranda, cards, drawings, reports, lists, legal opinions, letters, etc.

Exemplary Computing Environment

Referring now to the drawings, FIG. 1 is a block diagram depicting exemplary computing devices in an exemplary computing environment for implementing certain embodiments. In particular, FIG. 1 illustrates an example computing environment for generating an electronic document according to attestation requirements, such as attestation requirements specific to one or more organizations, signers, and/or locations. Computing services, platforms, and applications edit, display, store, serve and otherwise use electronic documents and other electronic content on the exemplary computing devices 104, 124, and 144 and servers 134 and 154. More particularly, a sender 102, signers 122 and 128, and witnesses 136 and 138 may interact with the computing environment to ensure that a document is signed in a manner that fulfills specified attestation requirements so that the executed document is binding at the locations and/or organizations of the sender 102, the signers 122 and 128, and the witnesses 136 and 138. To do so, the sender 102 and the signer 122 may operate computing devices 104 and 124, respectively, to connect to a server 134 over a network. As specified by attestation requirements, a witness 136 may also operate computing device 124 (or another computing device) to connect to server 134 as part of witnessing an electronic signature provided by signer 122. Similarly, the sender 102 and the signer 128 may operate computing devices 104 and 144, respectively, to connect to server 134 over the network. As necessitated by attestation requirements, another witness 138 may operate computing device 144 (or another computing device) to connect to server 134 as part of witnessing an electronic signature provided by signer 128. A service provider 132 may implement an electronic signature service 130 on the server 134 for facilitating the generation of the document to be signed. A conference provider 142 may implement an conferencing platform 142 on server 154 for hosting a conference and providing conference information 146 and conference credentials 156 for a conference used to witness and record proceedings relating to signing the electronic document. The conference can be an electronic meeting that facilitates participants coming together at a designated time. The conference provider 142 can use the conference platform 140 to recognize participants' presence and record actions taken during the conference. For example, the conference platform 140 can host an electronic meeting that comprises one or more conference sessions that correspond to the meeting.

As depicted in FIG. 1, the conference information 146 can include a real-time conference stream and/or a record of conference proceedings. For instance, the conferencing platform 140 can record a conference session used to sign an electronic document and provide recorded conference proceedings as part of conference information 146 that is sent to the electronic signature service 130. The electronic document can be identified in document information 106 sent from sender 102 to the electronic signature service 130 and then forwarded with document information 126 to one or more signers (e.g., signers 122 and/or 128). In an embodiment, conference information 146 is associated with the signed document and is retained as part of log information of the document. For example, any captured conference stream information or transcripts thereof can be transferred to the electronic signature service 130 and kept as part of the audit/permanent record of the signed document. The conferencing platform 140 can also provide conference credentials 156 to signers 122 and 128 and witnesses 136 and 138 that are requested to sign the document. As shown in FIG. 1, conference credentials 156 can include conference login credentials such as a conference identifier and a password or passcode that a user needs in order to be authenticated and connected to the conference.

In an example, the computing devices 104, 124, and 144 may be any type of computing device configured to communicate with another computing device over a network to access information. Examples of the computing devices 104, 124, and 144 include desktop computers, laptop computers, smart phones, video game consoles, smart televisions, tablet computers, portable gaming devices, personal digital assistants (PDAs), etc. Electronic documents to be signed by signers 122 and 128 using computing devices 124 and 144, respectively, can be replicated to, downloaded by, and/or uploaded from the computing devices 124 and 144. Document information 126 can be provided to computing devices 124 and 144 by an electronic signature service 130.

Electronic documents can be made available via an interactive conference session hosted on a conferencing platform 140. Electronic content for the conference session can be streamed to computing devices and can include multimedia hosted on web sites, such as Internet web sites, intranet web sites, standard web pages, or mobile web pages specifically formatted for display on mobile computing devices. Electronic content for a conference session can also include application software developed for computing devices 124 and 144 that is designed to perform one or more specific tasks at the computing devices so that signers 122 and 128 and witnesses 136 and 138 can participate in the conference. The content for a conference session can be in the form of electronic content streamed from server 154 to computing devices 124 and 144. Streaming electronic content can include, for example, audiovisual conference content provided using a streaming protocol, such as, but not limited to, real time messaging protocol (RTMP), HTTP dynamic streaming (HDS), and HTTP Live Streaming (HLS).

Similarly, the servers 134 and 154 may include a computing device such as a server, or may include a number of computing devices clustered as a computing system configured to host one or more network-based resources such as the electronic signature service 130 or the conferencing platform 140. A datacenter and a server farm are examples of such computing system. Computing devices 104, 124 and 144, and servers 134 and 154 may be connected by any type of communication network that may include, for example, any one or a combination of many different types of networks, such as cable networks, the Internet, wireless networks, cellular networks, and other private and/or public networks.

The sender 102 may be a person or an entity that may send a contract to a signer 122 for signature. In other words, the sender 102 may include a user of the electronic signature service 130 that may generate and send the contract to one or more signers 122 and 128. The sender 102 need not necessarily but may be a party to and may sign the electronic document. In comparison, the signer 122 may be a person or an entity singing the contract. In other words, the signer 122 may include a user of the electronic signature service 130 that may be a party to the contract and that may receive and sign the contract. Any or both of the sender 102 and the signer 122 may draft content of the contract. For example, the sender 102 and the signer 122 may negotiate terms of the contract, the sender 102 may draft the contract to include the terms, the signer 122 may provide feedback to the drafted terms, and the sender 102 and the signer 122 may sign the contract to memorialize an agreement to the terms of the contract.

Figure 4:
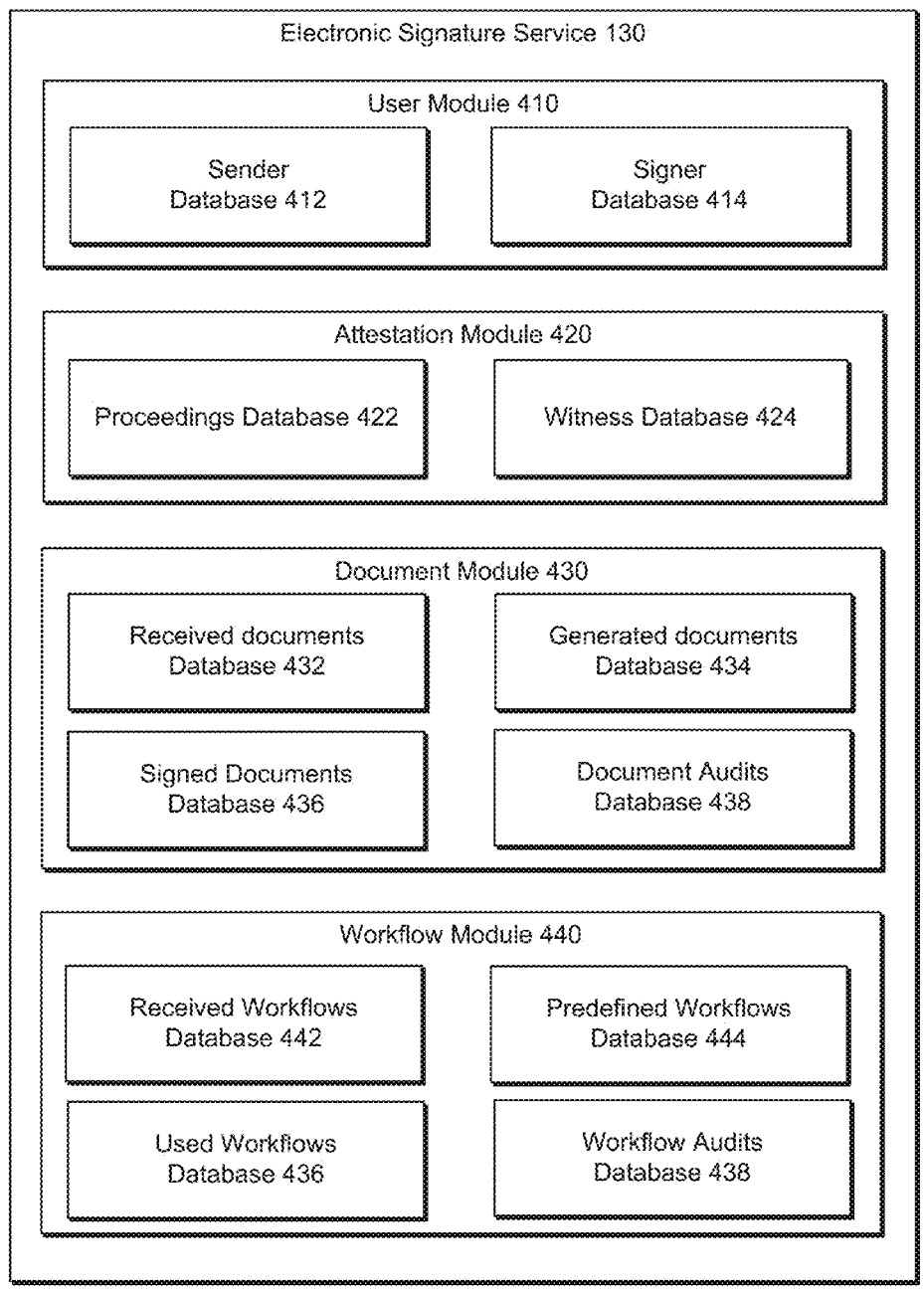
FIG. 4 illustrates an example computing architecture of a service for generating a document that meets various attestation requirements, in accordance with embodiments.

The electronic signature service 130 may be a network-based service (e.g., an online service) that may maintain information about the sender 102, the signer 122, jurisdiction or location-based attestation requirements applicable to contracts, and other information, such that a contract that meets various relevant organization-based attestation requirements can be presented to and signatures can be received from the sender 102 and the signer 122. The electronic signature service 130 may be implemented as a module within a document processing tool such as Echo-Sign® from Adobe®. FIG. 4 illustrates an example computing architecture for implementing the electronic signature service 130.

Figure 2:
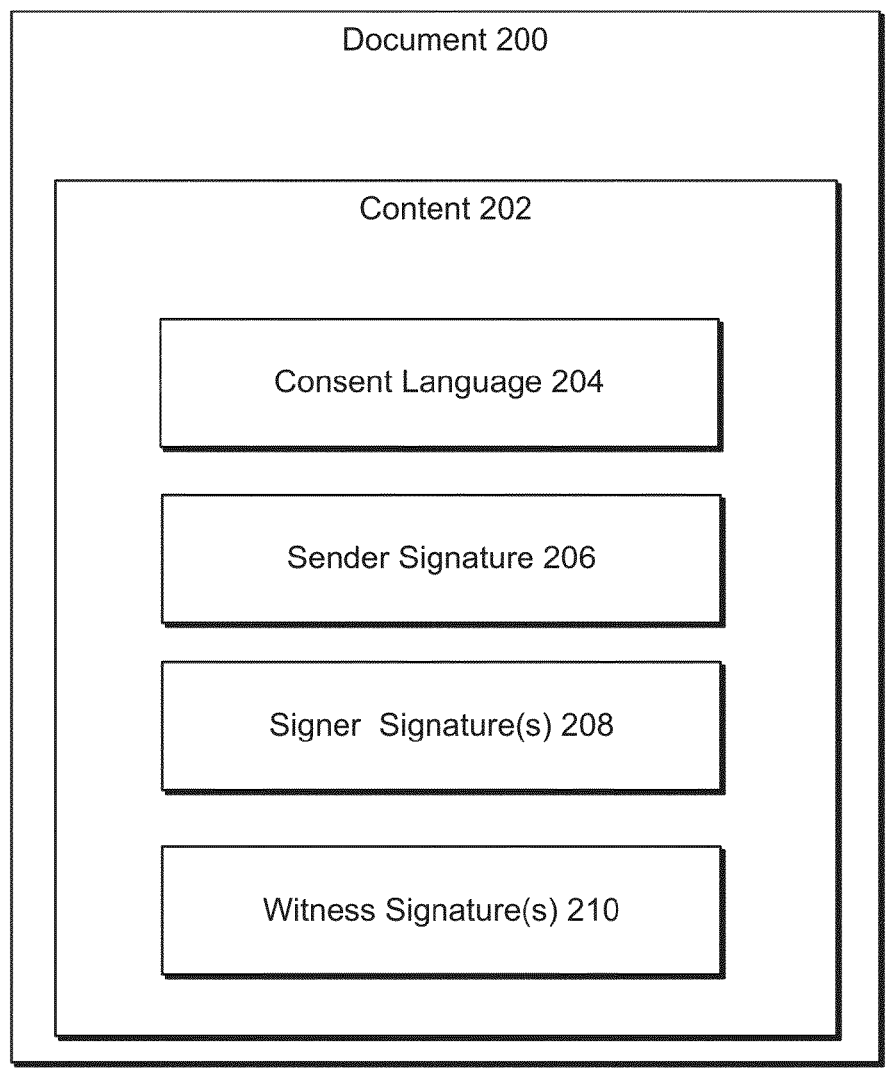
FIG. 2 illustrates an example document, in accordance with embodiments.
Figure 3:
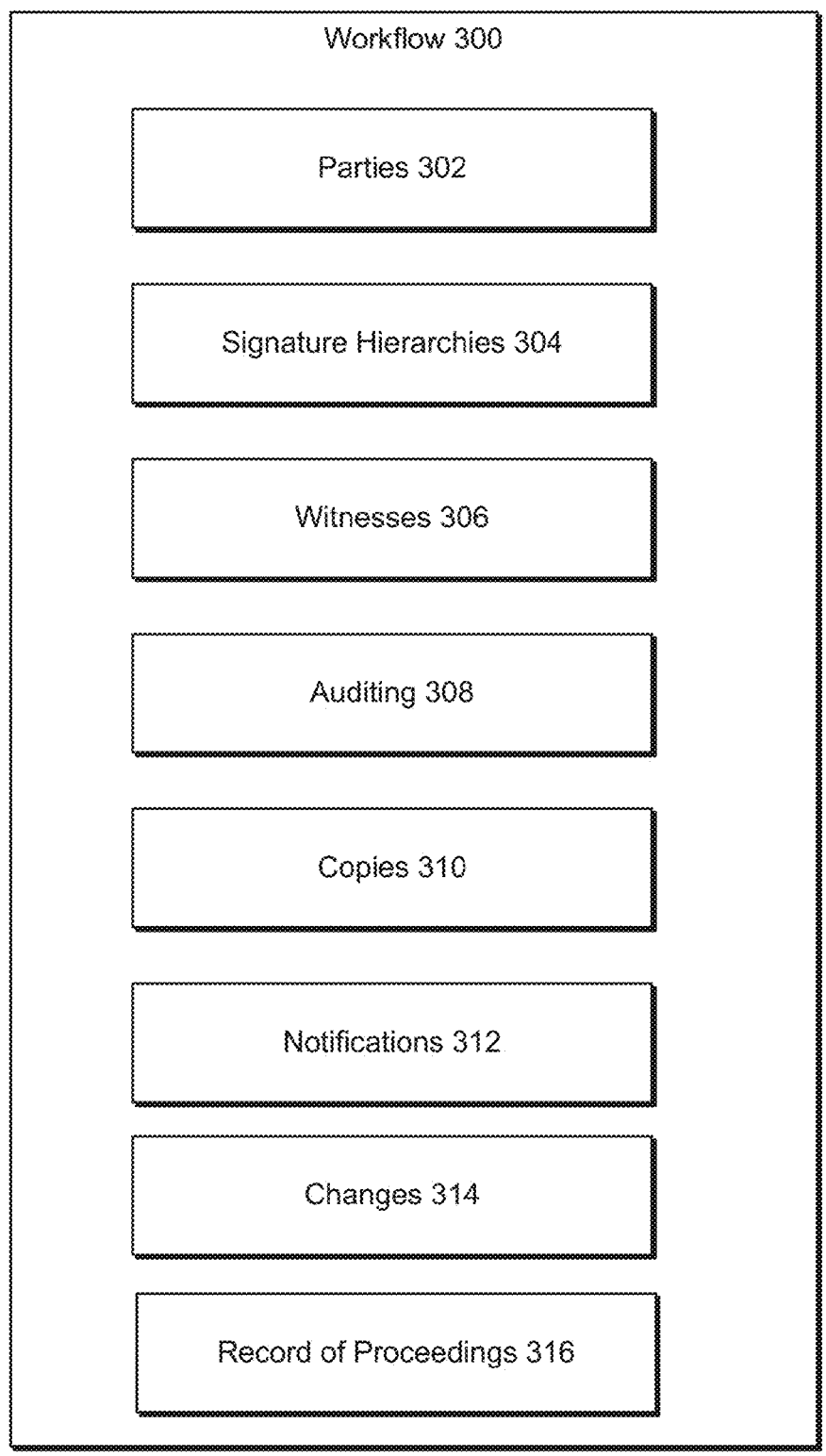
FIG. 3 illustrates example workflow associated with a document to be electronically signed, in accordance with embodiments.

The document to be signed may be an electronically represented document that may be exchanged between the sender 102 and the signer 122. The electronic signature service 130 may facilitate this exchange and may ensure that the document, the workflow associated with the document, and the signatures of the sender 102 and the signer 122 meet applicable requirements, including attestation requirements. FIGS. 2 and 3, which are discussed below, illustrate examples of a document and a workflow, respectively.

To be a binding contract, the document and/or the workflow may need to meet certain attestation requirements. These requirements may vary between jurisdictions and, thus, may be location-based attestation requirements for a document signature. For example, if a signer 122 is in a given jurisdiction, that signer's signature may need to be witnessed by witness 136, whereas the signature of another signer 128 in a different jurisdiction may only need to be recorded by conference platform 140 instead of being witnessed. Each jurisdiction may represent geographical boundaries or jurisdictions defined by national, international, or intra-national borders. An example of national borders may include the jurisdiction of the United States of America, Italy, or Japan. Similarly, an example of international borders may include the jurisdiction of the European Union. An example of intra-national borders may include the jurisdiction of California or Texas. Such jurisdictions may have different requirements as to the form, structure, content, and signatures of a document and/or a workflow associated with the document.

In addition to or in lieu of a jurisdiction, each location may represent a physical boundary or a virtual boundary. An example of a physical boundary may include location of two offices of a company: a location of a headquarters in one city (or on one floor of a building) and a location of a satellite office in another city (or on another floor of the same building). An example of a virtual boundary may include a virtual wall that may separate two offices of a company (e.g., sales and engineering) that may, in some situations, be located at the same physical location. Such companies may have requirements that may vary across the physical and/or virtual boundaries. For example, each office of a same organization may define its own requirements as to what constitutes a valid contract (e.g., what type of signatures may be acceptable, who may need to sign, and aspects of a workflow). Thus, the organization as a whole may have different requirements that may vary between the physical and/or virtual boundaries of the offices.

Further, in an example, the requirements may include legal requirements such that, when the document and workflow are in compliance, the document may be legally binding. These legal requirements may be defined by the jurisdictions where the document should be legally binding. In another example, the requirements may include non-legal requirements. For instance, these requirements may be based on procedures or policies of an organization such as a company, on personal preferences of the sender 102 and/or signers 122, 128, attestation requirements stipulating that signatures be witnessed by witnesses 136, 138, or other non-legal requirements.

To facilitate the interaction with the sender 102 and the signers 122 and 128, the service provider 132 may configure the electronic signature service 130 to receive and process document information 106 and document information 126 from the sender 102 and signers 122 and 128, respectively. Although two signers (e.g., signers 122 and 128) and two witnesses (e.g., witnesses 136 and 138) are depicted in FIG. 1, it is to be understood that in alternative embodiments, the document information 126 and conference credentials 156 can be exchanged with more than two signers and witnesses as needed to fulfill attestation requirements. Similarly, in embodiments where a document is to be signed by a single signer, document information 126 and conference credentials can be sent to that single signer. For example, the electronic signature service 130 may provide an interface to the sender 102 to input the document information 106 and an interface to the signer 122 to exchange the document information 126. Similarly, the conferencing platform 140 may provide an interface to exchange conference credentials 156 with the signer 122 and a single witness 136 associated with the signer 122. Each of the interfaces may be customized based on information about the respective user, such as the role of the user (e.g., a sender, a signer, a representative of a signer, a witness, and other functions).

In the example provided in FIG. 1, the document information 106 may include contract information. In other words, the sender 102 may generate the document locally at the computing device 104 and may upload the generated document to the electronic signature service 130 using the interface. Subsequently, the electronic signature service 130 may modify the uploaded document to meet the applicable requirements. In an example embodiment, the sender 102 may interact with the electronic signature service 130 via the interface to select a document template and to specify various document terms. In this example, the electronic signature service 130 may generate the document and, as generated, the document may at least the requirements applicable at the location of the sender 102.

In both examples, the document information 106 may also include information about a document execution workflow, about one or more signers 122 and 128, and about one or more witnesses 136 and 138. For instance, the sender 102 may specify a series or an order of actions that should be performed in conjunction with receiving signatures to the document. The actions can include attestation actions as stipulated by attestation requirements. For example, attestation requirements indicating that witness 136 is to witness the execution of a document signed by signer 122 can be included in the document information 106. Also, for example, the sender 102 may identify one or more signers 122 and 128 using respective user names, nicknames, account numbers, email addresses, or any other types of identifying information. Similarly, the sender 102 may identify the one or more witnesses 136 and 138 by providing a respective witness types (e.g., a notary or an identified officer of an organization), user names, nicknames, account numbers, email addresses, or any other types of identifying information for witnesses 136 and 138. Further, the document information 106 may include a signature of the sender 102 indicating assent to the terms of the document (e.g., contract terms).

On the other hand, the document information 126 received from the signer 122 or another signer 128 may include similar type of information. For example, a signer may identify their jurisdiction, their location, their organization, or other information relevant to the attestation requirements for the document. The signer may be granted privileges to modify or add to the workflow, and/or privileges to edit the document. This may allow multiple parties (the sender 102, the signer 122, and another signer 128) to collaborate on the document. In another example, the document information 126 may be limited to other types of information. For instance, the document information 126 may include a location, if needed, and a signature of the signer 122.

The electronic signature service 130 may be configured to process the document information 106 and the document information 126 such that a document that meets the applicable requirements may be presented to the sender 102 and the signer 122, signatures may be received from the sender 102 and the signer 122, and workflow actions may be executed. For example, based at least in part on the document information 106 and the document information 126, the electronic signature service 130 may determine the locations of the sender 102 and the signer 122 and one or more witnesses 136 and 138, may determine the corresponding requirements, and may accordingly generate or update the document and workflow.

As illustrated in FIG. 1, the sender 102 may exchange document information 106 with the electronic signature service 130, where the document information 106 can include information about a contract to be signed by a signer 122 and another signer 128. The signers 122 and 128 may be located in different physical locations corresponding to different jurisdictions. Each of these jurisdictions may have different attestation requirements that may apply to the contract, including what types of electronic signatures may be legally binding, witnessing requirements for the electronic signatures, what contractual statements may be required, and what actions may need to be performed and recorded in order to attest to the authenticity of an electronic signature.

For example, depending on the type of document being signed and a state or municipal jurisdiction within the United States of America, various types of electronic signatures by a signer 122 may be recognized only if witnessed by a witness 136 who is a registered notary public. In comparison, if another signer 128 executes the document in the European Union, that signature be recognized cryptographic if it is a digital signature using a digital certificate, where such digital certificate may need to chain up to a trusted root certificate issued by a European Certificate Authority. Alternatively, if the signer 128 is subject to the laws of Japan, that signer's signature may be subject to attestation requirements that require an audit trail that tracks changes to the document to be provided to a Japanese government agency. The described laws herein are for illustrative purposes and are used to exemplify that different jurisdictions can have different attestation and other document execution requirements applicable to an electronic document and/or a document execution workflow, such as to the associated form, structure, content, signatures of the document, witnessing of the signatures, and/or recording portions of the document execution workflow for use as an audit trail.

Without using the electronic signature service 130, it may incumbent on the sender 102 and/or the signer 122 to know the various attestation, proceedings recording, and other requirements and to ensure that the document and the workflow meet these requirements. In comparison, by using the electronic signature service 130, the sender 102 and/or signer 122 need not know the various-location based and other requirements. Instead, the electronic signature service 130 may automatically determine and ensure that the document and the workflow comply with these requirements.

To illustrate and continuing with the previous example of the jurisdictions of the United States of America, the European Union, and Japan, using knowledge about the respective locations of the sender 102, signers 122 and 128, and the one or more witnesses 136 and 138, the electronic signature service 130 may automatically determine which jurisdictions the executed document needs to be recognized in, and modify the document context and/or workflow to meet the attestation requirements of these jurisdictions. For instance, the electronic signature service 130 may add a witness signature block to the document, may add a notary information block to the document, may update the signers 122 and 128 respective signature fields to only accept a proper digital certificate, may present the document as modified to the sender 102 and the signers 122, 128. Further, the electronic signature service 130 may receive required signatures, may use the conferencing platform 140 to make a record of changes and save that record as an audit trail for the document, and may provide a copy of the audit trail as stipulated by jurisdiction-based attestation requirements.

Exemplary Document

FIG. 2 illustrates an example document 200 that the electronic signature service 130 may process for the sender 102 and the signers 122 and 128. The document 200 depicted in FIG. 2 is described with reference to the embodiments of FIG. 1. However, the document is not limited to those example embodiments.

As shown in FIG. 2, the document 200 may include content 202. In embodiments where the document 200 is a contract, various contract terms and other information that may memorialize an agreement between the sender 102 and the signer 122 may be included in the content 202. For example, the consent language 204 may be a field that the electronic signature service 130 may update to include a proper consent statement.

Additionally, the document 200 may include consent language 204, a sender signature 206, a signer signature 208, and a witness signature 210, each of which may include one or more fields for inputting information such that the executed document may meet certain attestation requirements. The sender signature 206, the signer signature 208, and the witness signature 210 may correspond to fields where sender 102, a signer 122, and a corresponding witness 136, may input their signatures, respectively. The consent language 204, the sender signature 206, the signer signature 208, and the witness signature 210 may be located in multiple portions, sections, or pages within the content 202. As depicted in FIG. 2, in cases where the document 200 is requested to be signed by multiple signers (e.g., signers 122 and 128) and/or witnessed by multiple witnesses (e.g., witnesses 136 and 138), the document 200 can include a signer signature 208 and a witness signature 210 for each of the signers and witnesses.

The electronic signature service 130 may configure the signature fields (e.g., sender signature 206, signer signature 208, and witness signature 210) to accept various types of electronic signatures. In general, an electronic signature may be embodied as information representing an assent of a user (e.g., the sender 102, a signer 122, or a witness 136) to the terms of the document 200. For example, an electronic signature may be electronic data representing a click-through response (e.g., clicking an acceptance/agree button), a typed signature, a computer generated signature for a user, a scanned signature for a user, a faxed signature of a user, a voice recording, a finger swipe, a photo or video of a user, a biometric reading (e.g., finger print, iris scan, voice print, or another biometric measure) or any other data that may indicate that a user agrees to the content 202. An electronic signature may also include a digital signature. In addition to serving as an electronic signature, voice recording, a photo, and/or a video of a user can be provided, for example, by the conferencing platform 140. The conferencing platform 140 can record a conference session used to sign the document 200 and provide recorded conference proceedings as part of the conference information 146 that is sent to the electronic signature service 130. A digital signature may employ asymmetric cryptography techniques and may use certain hardware (e.g., a smartcard, a universal serial bus (USB) dongle, or other hardware), software (e.g., a certain cipher suite such as one that may implement a data encryption algorithm (DEA) or other cryptography algorithm), and/or a public key infrastructure (PKI). For example, a certificate authority may issue a digital certificate stored on a smartcard to the signer 122. To digitally sign the document 200, the signer 122 may attach the smartcard to the computing device 124 and may operate an interface to the electronic signature service 130. In turn, the electronic signature service 130 may access the digital certificate on the smartcard and may apply a one-way cryptographic hash of the content 202 and the digital certificate such that the document 200 is digitally signed.

Further, metadata associated with the document 200 may be embedded within or may be stored along with the document 200. For example, the metadata data may include information descriptive of the content 202, authors of the document 200, circumstances surrounding generating and signing the document 200 (e.g., activities, tools, timestamps, and other information). In addition to maintaining this metadata, the electronic signature service 130 may also track and record changes to the document 200 as an audit trail associated with the document 200. The audit trail may be embedded in the document 200, in the metadata, or may be maintained in a separate file. For example, as changes are made to the document 200 to meet the attestation requirements, or when signatures are entered in the sender signature 206 and the signer signature 208, the electronic signature service 130 may include corresponding descriptive information in the audit trail.

Once the document is presented and the required signatures are received, the document 200 and the associated metadata and audit trail may be protected against tampering. For example, the electronic signature service 130 may digitally sign the document 200, the metadata, and the audit trail using a digital certificate of the electronic signature service 130. In this way, the content 202, the consent language 204, the sender signature 206, the signer signature 208, the metadata, and the audit trail may be secured with the digital certificate of the electronic signature service 130 and can be verified accordingly.

Exemplary Workflow

FIG. 3 depicts an exemplary workflow associated with a document to be electronically signed. In particular, FIG. 3 illustrates a workflow 300 that can include a number of actions that should be performed when generating and entering signatures in the document 200. The workflow 300 depicted in FIG. 3 is described with reference to the embodiments of FIGS. 1 and 2. However, the workflow 300 is not limited to those example embodiments. The workflow 300 in general, and some or all of the actions in particular, may need to meet attestation and other requirements.

The workflow 300 may be defined by the sender 102, one or more signers 122 and 128, one or more witnesses 136 and 138, and/or the electronic signature service 130. For example, the sender 102 may identify a number of actions that should be executed in association with electronically signing the document 200. In this example, the sender 102 may identify the signer 122, specify an order of electronic signatures (e.g., when there are multiple signers 122 and 128), indicate whether the electronic signature service 130 can modify the document 200 or the workflow 300 to meet attestation and other requirements, request that a copy of the signed document 200 be stored at a certain server or other location, and specify other type of information pertinent to the execution and handling of the document 200. In one example, a copy of the signed document 200 can be stored at server 134. Similarly, when notified of the document 200, the signer 122 may further define other actions or modify some of the actions defined by the sender 102. For example, the signer 122 may identify additional signers, such as signer 128, or may modify the order of electronic signatures of signers and any witnesses. Additionally, the electronic signature service 130 may define or modify other actions based, on for example, attestation requirements. For example, if an attestation requirement specified by the sender 102 or signer 122 dictates an auditing of the document 200, the electronic signature service 130 may modify the workflow 300 to perform such auditing. These and other features of the workflow 300 are further described herein next.

As explained above, some or all of the actions may be specified by, for instance, the sender 102, the signer 122, and/or the electronic signature service 130. Also, some or all of the actions may be derived and/or modified based on the applicable requirements. For example, the sender 102 may identify at an interface to the electronic signature service 130 the parties to the document 200, the hierarchy of the signatures, and locations where the document 200 may be relevant. Similarly, the signer 122 may identify at an interface to the electronic signature service 130 that a copy of the document 200 should be stored at a certain server. Additionally, based on the various applicable attestation requirements, the electronic signature service 130 may determine that auditing of the document 200 may be required.

The workflow 300 may include identifiers of the parties 302 that should sign the document 200. These identifiers may include identifiers of the sender 102, the signer 122, and other parties to the document. The workflow 300 may also include a signature hierarchy 304. For example, when multiple signatures are required, the signature hierarchy 304 may specify the order in which the signatures may need to be collected (e.g., in what order the parties need to sign the document 200).

The workflow 300 may also include identifiers of witnesses 306. This may include witness 136 and any additional witness, such as witness 138, in addition or in lieu of the location(s) of the parties, where the document 200 may be relevant. Further, the workflow 300 may include an indication of whether auditing 308 of the document 200 and/or the workflow 300 is required by attestation requirements. If so, the workflow 300 may include a process executable to track changes made to the document 200, and/or to record conference proceedings associated with changing the document, and/or the workflow 300 and may associate the resulting information with the document 200 (e.g., by adding an audit trail to the metadata of the document 200).

In addition, the workflow 300 may include an indication as to whether copies 310 of the document 200 should be distributed, and if so, who may be the recipients. Similarly, the workflow 300 may include information about required notification 312. For example, when changes are made to the document 200, a notification 312 may identify whether the sender 102/or the signer 122 should be notified. Similarly, when electronic signatures are received, a notification 312 may identify whether certain entities or agencies should be notified.

The workflow 300 may also include information indicative of whether changes 314 to the document 200 and/or the workflow 300 are allowed or pre-authorized and, if so, the scope or extent of such changes. For example, the sender 102 may allow the electronic signature service 130 to change the type of acceptable signatures for the sender signature 206, the signer signature 208, and the witness signature 210, but may prohibit changes to the consent language 204. As such, if the electronic signature service 130 determines that changes to these fields are required to meet the applicable attestation requirements, the electronic signature service 130 may only automatically change the sender signature 206, the signer signature 208, and the witness signature 210, may not automatically change the consent language 204, and may return the document 200 as modified to the sender 102 with an indication that the consent language 204 may need further updates.

As shown in FIG. 3, the workflow 300 may also include information indicating whether proceedings associated with signing the document 200 are to be recorded. For example, if attestation requirements stipulate that conference proceedings associated with receiving the sender signature 206, the signer signature 208, and the witness signature 210 are to be recorded, the conferencing platform 140 can record the conference proceedings.

This list of actions of the workflow 300 is illustrative and is not exhaustive. One of ordinary skill in the art may appreciate that the sender 102, the signer 122, and/or the electronic signature service 130 may specify other actions.

As described above, the electronic signature service 130 may modify the document 200 and/or the workflow 300 to meet the applicable requirements.

Exemplary Electronic Signature Service Architecture

FIG. 4 illustrates an example computing architecture of the electronic signature service 130. More particularly, the electronic signature service 130 may include various modules such as a user module 410, an attestation module 420, a document module 430, and a workflow module 440, each of which is described in the following paragraphs. These modules may be interconnected such that the document 200 and/or the workflow 300 may be modified to meet applicable attestation and other requirements. The architecture depicted in FIG. 4 is described with reference to the embodiments of FIGS. 1-3. However, the architecture is not limited to those example embodiments.

The user module 410 may host an interface that can be presented to a user (e.g., a sender 102 or a signer 122) to allow the user to provide document-related information and user-related information. The document-related information may include document information 106 when the user is a sender 102 and document information 126 when the user is a signer 122. The user-related information may be information about the user, such as a user name, a password, profile information, and other information. Such information may be stored at a database. As shown in FIG. 4, the user module 410 may have access to a sender database 412 for storing information about a sender and a signer database 414 for storing information about a signer. These databases may be stored on a storage device internal to the server 134 that hosts the electronic signature service 130 or on a storage device accessible to the electronic signature service 130 over a network.

Generally, the user module 410 may configure the interface to allow a sender (e.g., a sender 102) to perform a number of operations such as creating a profile (an account that stores sender information), logging-in using the profile, using the electronic signature service 130 as a guest, uploading a document, creating a document, specifying a workflow, specifying attestation requirements, specifying a number of locations (e.g., a location of the sender, a location of a signer, other locations where the document may be relevant), specifying what changes to a document can be made, specifying what changes to a workflow can be made, signing a document, and paying for using the electronic signature service 130. The user module 410 may also configure an interface to provide similar or different operations to a signer or a witness. For example, the interface may allow a signer to create a profile and log-in accordingly, use a service as a guest, receive a document such as a contract, specify an attestation requirement, specify a location, specify a change to the document and/or workflow, sign a document, and pay for using the electronic signature service 130. Further, the user module 410 may determine, based on identifiers of the users (e.g., the sender, the signer, the witness, or other users), requirements that may be specific to the users. These requirements may be stored at the sender database 412 and/or the signer database 414.

The attestation module 420 may be configured to determine a number of locations where the document may be relevant and the corresponding attestation requirements. Various techniques may be used to determine a location. For example, the attestation module 420 may retrieve a location of a sender from the sender database 412 and a location of a signer from the signer database 414. In another example, a sender and/or a signer may enter locations at an interface (e.g., the interfaces facilitated by the user module 410) to provide the locations to the attestation module 420. In yet another example, if a location of a user (e.g., a sender, a signer, or a witness) is not supplied by the user, the attestation module 420 may determine a location of a computing device that the user is operating to connect to the electronic signature service 130 (e.g., a computing device 104 of a sender 102 and a computing device 124 of a signer 122). For example, the attestation module 420 may receive global positioning system (GPS) coordinates (or any other satellite-generated coordinates), network-based location (e.g., cell tower triangulation, WiFi triangulation, internet protocol (IP) geolocation), or other location information of the user's computing device.

Once the organizations and/or locations of signers are determined, the attestation module 420 may determine applicable attestation requirements. For example, the attestation module 420 may have access to a proceedings database 422 and a witness database 424. The proceedings database 422 may be stored on a storage device internal to the server 154 that hosts the conferencing platform 140 or on a storage device accessible to the conferencing platform 140 over a network. Further, the proceedings database 422 may be maintained by the conference provider 142 of the conferencing platform 140 and/or by another party. Similarly, the witness database 424 may be stored on a storage device internal to the server 134 that hosts the electronic signature service 130 or on a storage device accessible to the electronic signature service 130 over a network. Also, the witness database 424 may be maintained by the service provider 132 of the electronic signature service 130 and/or by another party. Using the determined organizations and/or locations, the attestation module 420 may retrieve the corresponding proceedings recording requirements from the proceedings database 422. The attestation module 420 may also retrieve witness information from the witness database 424 and the attestation module 420 may codify attestation requirements for a document in a rule set that can be applied to the document and the workflow for creating, modifying, and signing the document. If there are conflicting requirements that cannot be combined (e.g., one jurisdiction or organization requires recording the creation of a digital signature while another jurisdiction or organization prohibits recording digital signatures), the attestation module 420 may identify and provide notifications of such conflicts.

The proceedings database 422 may contain conference proceedings that have been transferred from the conferencing platform 140 to the electronic signature service 130. Such proceedings can become part of the audit information of a signed document. For example, proceedings from proceedings database 422 can be retrieved and are viewable as proof that a document (e.g., a contract) was signed by certain signers and witnessed by designated witnesses. Portions of conference proceedings pertaining to electronic signatures can be stored in proceedings database 422 according to jurisdiction-based or organization-based attestation requirements. Such attestation requirements that may include requirements applicable to a contract, such as required contract language, acceptable signature types, witnessing procedures, and other workflow actions.

The witness database 424 may contain records that correspond to witnesses that an organization, such as a company, has designated to verify the identities of signers of a document. Various senders 102 and organizations may define attestation requirements using various techniques. For example, a service provider associated with the electronic signature service 130 (e.g., a service provider 132) may determine the attestation requirements of each applicable jurisdiction and identify appropriate witnesses in the witness database 424. In another example, an authority associated with a jurisdiction may supply the corresponding jurisdictional requirements and determine appropriate witnesses in the witness database 424 by way of, for instance, an interface that the electronic signature service 130 may host. Similarly, an administrator of an organization such as a company may use a similar interface to enter the organization's attestation requirements for a particular document to be signed. In yet another example, a sender 102 may be an employee or agent of an organization (such information may be stored in the sender database 412) and may enter certain attestation requirements of the organization when using the electronic signature service 130 in order to generate a valid document to be signed. The electronic signature service 130 may store these requirements and retrieve information for required witnesses 136 and 138 from the witness database 424. In an embodiment, over time, as more organizations and their employees and agents use the electronic signature service 130, the service may build a full or a near full set of attestation requirements and witnesses specific to that company.

The document module 430 may be configured to perform various document-related operations. For example, the document module 430 may allow a user (e.g., a sender 102) to specify a document, may edit the document to meet applicable requirements, and may audit the document.

To specify a document, the document module 430 may be configured to allow a user to upload a document to the electronic signature service 130 or to use an interface of the electronic signature service 130 to create a document. For example, the document module 430 may interface with the user module 410 such that the interface presented to the user may allow this functionality. More particularly, a sender (e.g., a sender 102) may operate a computing device that interfaces with the electronic signature service 130 over a network (e.g., a computing device 104) and may use a tool local to the computing device to create the document and to upload the document to the electronic signature service 130. In another example, the sender may use the electronic signature service 130 to remotely create a document, without locally creating and uploading the document. In this case, the document module may present a document template to the user over the interface, may allow the user to edit portions, sections, or fields of the document template, and may generate the document accordingly.

Further, the document module 430 may store a received document, such as, for example, a contract, in a received documents database 432 and a generated contract in a generated documents database 434. The databases 432 and 434 may be stored on a storage device internal to the server 134 that hosts the electronic signature service 130 or on a storage device accessible to the electronic signature service 130 over a network. As further explained herein below, to meet the applicable requirements, a received document may be updated after being received, whereas a generated document may be generated based on the requirements (e.g., the generated document may automatically meet the requirements without needing further updates).

To edit a document to meet applicable attestation and other requirements, the document module 430 may identify the user, determine the relevant organizations and locations, and use this information to generate a rule set that combines the corresponding requirements. To do identify the user and determine the relevant organizations and locations, the document module 430 may use various techniques. In an example, the document module 430 may interface with the attestation module 420 to determine the organizations and locations and to retrieve the corresponding attestation requirements and/or rule set. Similarly, the document module may interface with the user module 410 to determine identifiers of the users and to retrieve user-specific requirements and/or rule set. In another example, the document module 430 may parse the document to determine from the document contents and terms organizations, locations, and identifiers that are relevant to the document. For instance, if the contract includes a clause describing a governing law jurisdiction and identifies the users, the document module 430 may extract and use this information to interface with the attestation module 420 and the user module 410 to retrieve the applicable attestation requirements and/or rule sets.

Once retrieved, the document module 430 may unify the applicable requirements and/or rule sets in a single rule set. The document module 430 may parse the content of the document to determine whether the document meets this rule set. If so, the document module 430 may not modify the document. Otherwise, the document module 430 may edit the document, as allowable, to meet the rule set. If a certain edit cannot be performed because of a certain conflict (e.g., a sender specifies that the electronic signature service 130 may not modify a signature field but the rule set indicates that the signature field should be changed), the document module 430 may identify and provide a notification of this conflict. In addition to this type of notification, the document module 430 may track edits to the document and may provide notifications and/or summaries of these edits.

To illustrate, when a contract is received from a user, the document module 430 may apply text recognition, optical character recognition (OCR), or other techniques to determine the content of the contract. The content may be searched and cross-checked against the requirements defined by the rule set. For example, if the rule set requires language that states "I hereby certify that I have read, understood, and agree to the terms of the contract" but such language is not found in the contract, the document module 430 may determine that the contract needs to be modified and, if authorized, may modify the contract accordingly. In an additional or alternative example, if the rule set requires a certain type of signature (e.g., a digital signature), the document module 430 may add a tag to a signature field of the contract such that, when the contract is presented for signature, the tag may only allow a proper signature to be added to or inserted in the signature field. In yet another example, if the rule set requires two types of signatures, such as an entry by some drawing means (e.g., drawing a signature or entering a scanned signature) and a typed entry (e.g., a typed name), and the contact only presents an input region for one of the two types of signatures, the document module 430 may use whitespace finding and automatically add the necessary input region.

In another illustration, when a contract is remotely created using the electronic signature service 130, the document module 430 may select and present a contract template to the user for editing. If the applicable rule set is available at that time (e.g., the attestation requirements are known at that time), the electronic signature service 130 may use the rule set to generate the contract such that the contract may automatically meet the requirements (e.g., by selecting a contract template that meets the rule set and allowing the user to only perform edits that meet the rule set). As such, no further updates may be needed for the contract. Otherwise, the generated contract may subsequently be updated to meet the rule set. In this case, the electronic signature service 130 may parse and update the edits to meet the rule set. Similar techniques as described herein above (e.g., text recognition) may be applied for this purpose. Additionally or alternatively, because a document template is used in this case, the document template may be pre-configured such that edits made thereto may be compared to the rule set. For example, tags may be associated with the various editable fields of the contract, and when a field is edited, the document module 430 may update a corresponding tag with a description of the edit. To determine if the edit meets the rule set, the document module 430 may compare the description to the requirements of the rule set. If the requirements are not met, the document module may update, if authorized, the edit accordingly.

To audit a document, the document module 430 may be configured to keep track of changes made to a document such as a contract. In accordance with attestation requirements, the document module 430 may save the tracked changes in an audit trail that can be embedded in the contract, in the metadata of the contract, or in an audit file. Further, the document module 430 may store the audit trail in a document audits database 438. Similarly, when a document such as a contract is signed, the document module 430 may store the signed contract in a signed documents database 436. In this way, the document module 430 may provide a user with access to audit information and records of a signed contract.

In addition, the document module 430 may use the signed documents database 436 when auditing a signed document such as, for example, an executed contract. For example, by comparing an executed contract from the signed documents database 436 to a corresponding contract from the received documents database 432 or from the generated documents database 434, the document module 430 may determine changes made to the contract and may store these changes in an audit trail in the document audit database 438. The databases 436 and 438 may be stored on a storage device internal to the server 134 that hosts the electronic signature service 130 or on a storage device accessible to the electronic signature service 130 over a network.

The workflow module 440 may be configured to perform various workflow-related operations. For example, the workflow module 440 may allow a user (e.g., a sender, a signer, a witness) to specify a workflow associated with a document, may edit the workflow to meet applicable requirements, and may audit the workflow.

To specify a workflow, the workflow module 440 may be configured to allow a user to use an interface of the electronic signature service 130 to create a workflow. For example, in conjunction with uploading a created document or creating a document, a sender may also specify a workflow for that document. Similarly, in conjunction with receiving or signing a document, a signer may specify a workflow or a modification to an already specified workflow for that document. The workflow module 440 may interface with the user module 410 such that the interface presented to a user may allow this functionality. Also, the workflow module 440 may store received workflows (or modifications) in a received workflows database 442. In another example, a user need not specify a workflow. Instead, the workflow module 440 may select a predefined workflow from a predefined workflows database 444. The databases 442 and 444 may be stored on a storage device internal to the server 134 that hosts the electronic signature service 130 or on a storage device accessible to the electronic signature service 130 over a network.

To edit a workflow to meet applicable attestation and other requirements, the workflow module 440 may interface with the attestation module 420 and the user module 410 to retrieve an applicable rule set. For example, when a workflow is specified by a user, the workflow module 440 may parse and compare the workflow to the requirements of the rule set to determine whether the workflow meets the rule set. If so, the workflow module 440 may not modify the workflow. Otherwise, the workflow module 440 may modify the workflow, as allowable, to meet the rule set. If a certain modification cannot be performed because of a certain conflict (e.g., a sender specifies that a copy of the document may not be stored with a third party but the rule set indicates that a copy should be provided to a certain third party such as a government agency), the workflow module 440 may identify and provide a notification of this conflict. In addition to this type of notification, the workflow module 440 may track edits to the workflow and may provide notifications and/or summaries of these edits.

In another example, if the workflow is generated from a predefined workflow and the organization and/or location of the user is known (e.g., the applicable rule set is available), the predefined workflow may be selected to meet the attestation requirements of the applicable rule set. However, if the organization and/or location of the user is not known, the predefined workflow may be subsequently modified as needed to meet any subsequently identified requirements when the organization and/or location becomes known.

To audit a workflow, the workflow module 440 may be configured to keep track of changes made to a workflow. The workflow module 440 may save the tracked changes in an audit trail that can be embedded in the document, in the metadata of the document, or in an audit file. Further, the workflow module 440 may store the audit trail in a workflow audits database 448. Additionally, when an action of a workflow is executed (e.g., the electronic signature service 130 performs an action specified in the workflow), the workflow module 440 may store an indication of the step in a used workflows database 446. In this way, the workflow module 440 may provide a user with access to audit information and records of a workflow. The databases 446 and 448 may be stored on a storage device internal to the server 134 that hosts the electronic signature service 130 or on a storage device accessible to the electronic signature service 130 over a network.

Although FIG. 4 illustrates the various modules of the electronic signature service 130 as separate modules, some or all of these modules may be combined. The various modules may be interconnected and/or combined such that the electronic signature service 130 may minimize the effort needed on behalf of a sender and/or a signer to generate a document that meets applicable attestation and other requirements. More particularly, the sender and/or the signer need not be aware or have knowledge of these requirements. In other words, when specifying a document or a workflow, the sender and/or the signer need not invest time and resources in determining what these requirements may be. Instead, the sender and/or the signer may turn to the electronic signature service to modify the document and/or the workflow to meet the requirements.

Exemplary Methods

FIGS. 5, 6, 7, and 8 are flowcharts illustrating exemplary methods for modifying a document and/or a workflow in accordance with attestation and other requirements. Such exemplary methods may be performed on a variety of computer devices including, but not limited to, the computing devices 104, 124, and 144, and the servers 134 and 150 of FIG. 1, and the computing system 900 of FIG. 9. For purposes of illustration and not limitation, the features of the exemplary methods shown in FIGS. 5-8 are described with reference to elements of FIGS. 1-4.

In embodiments, each of the illustrative operations or steps shown in FIGS. 5-8 may be embodied in, and fully or partially automated by, modules executed by one or more processors of a computing system hosting an electronic signature service (e.g., a server 134 hosting an electronic signature service 130). The modules may include, for example, a user module 410, an attestation module 420, a document module 430, a workflow module 440, and other modules that the electronic signature service 130 may implement. Also, while the operations are illustrated in a particular order, it should be understood that no particular order is necessary and that one or more operations may be omitted, skipped, and/or reordered. Further, in the interest of clarity of explanation, an electronic signature service and a conferencing platform are described as performing the illustrative operations. Nevertheless, other or additional modules of a computing system may be configured to implement one or more of the operations and/or one or more steps of the operations.

Figure 5:
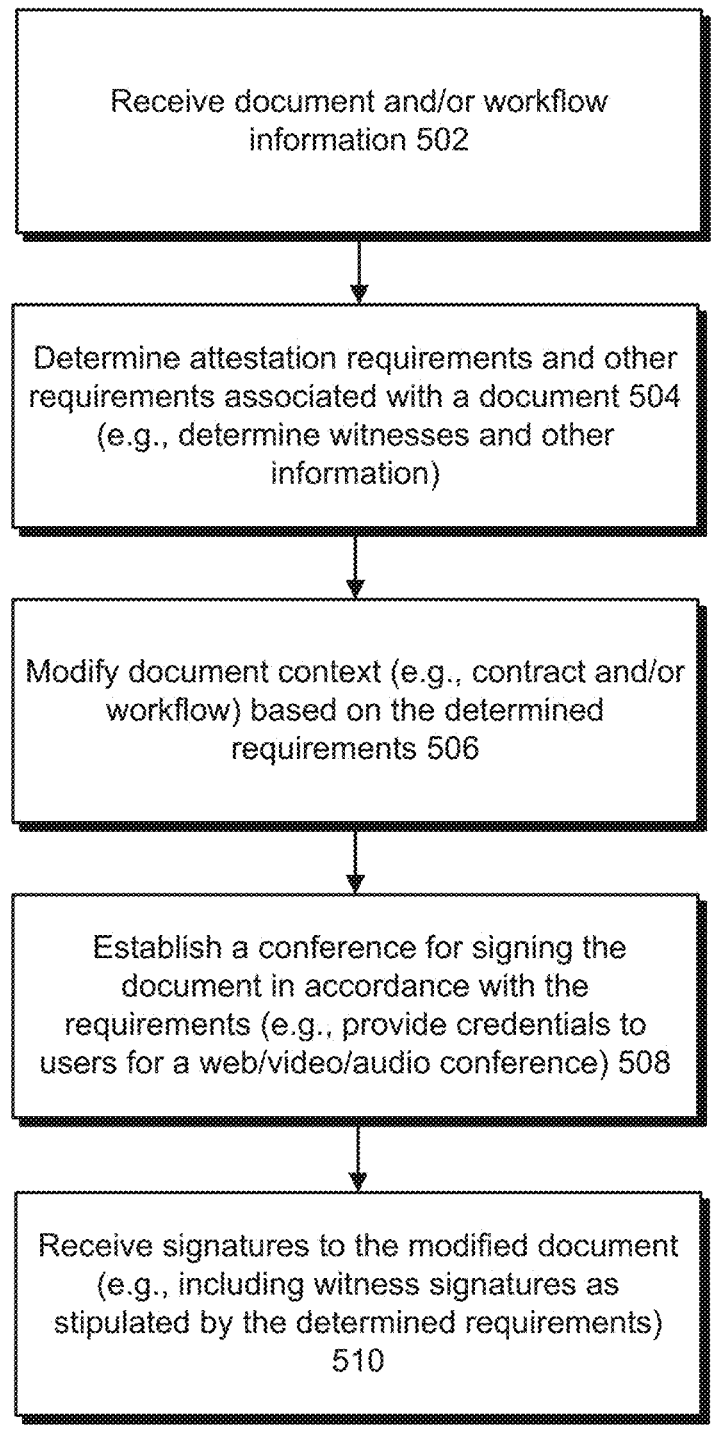
FIG. 5 is a flowchart illustrating an exemplary method for generating a document that meets various attestation requirements, in accordance with embodiments.
Figure 6:
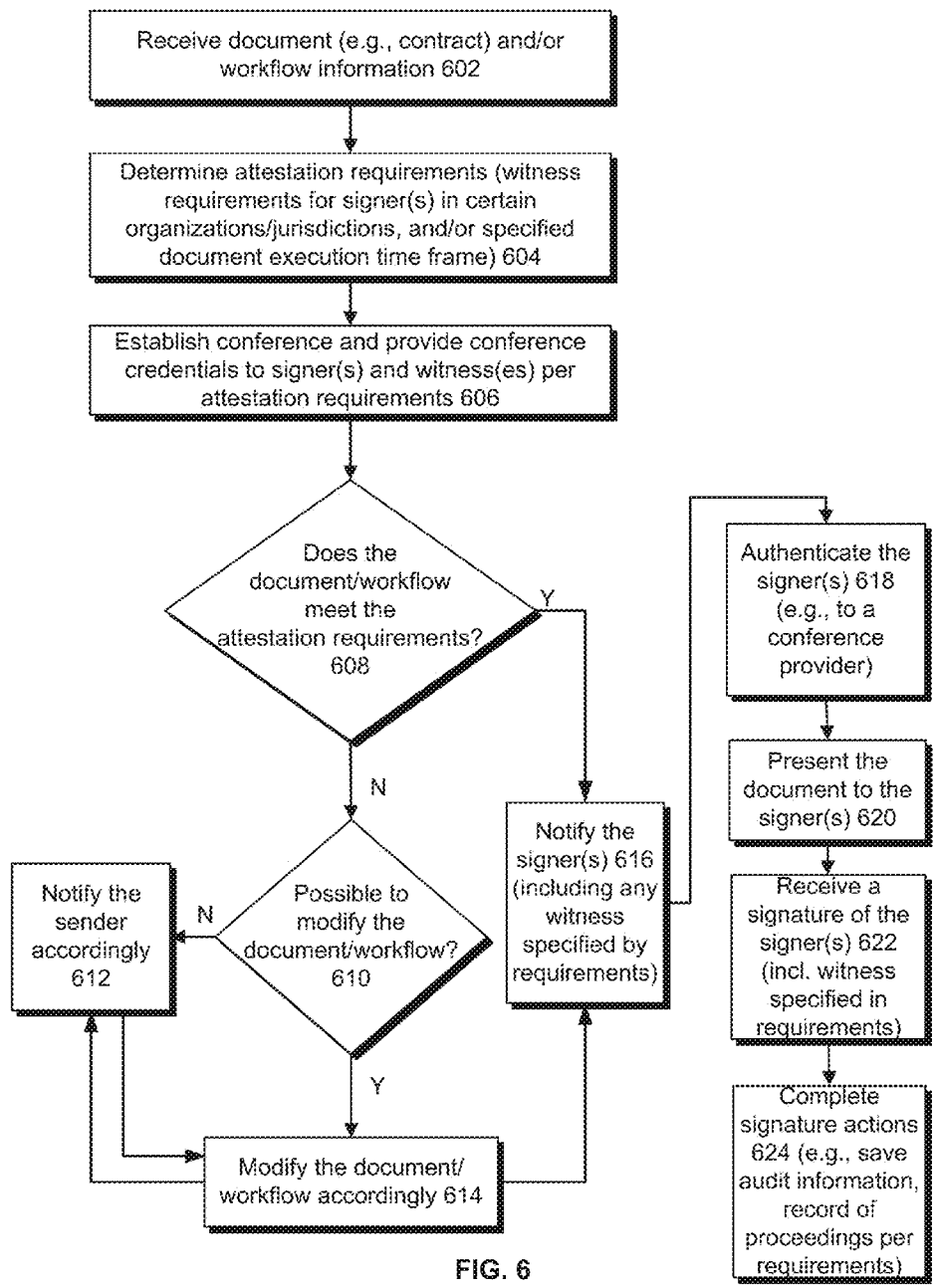
FIG. 6 is a flowchart illustrating an exemplary method for generating a document that meets various attestation requirements, in accordance with embodiments.
Figure 7:
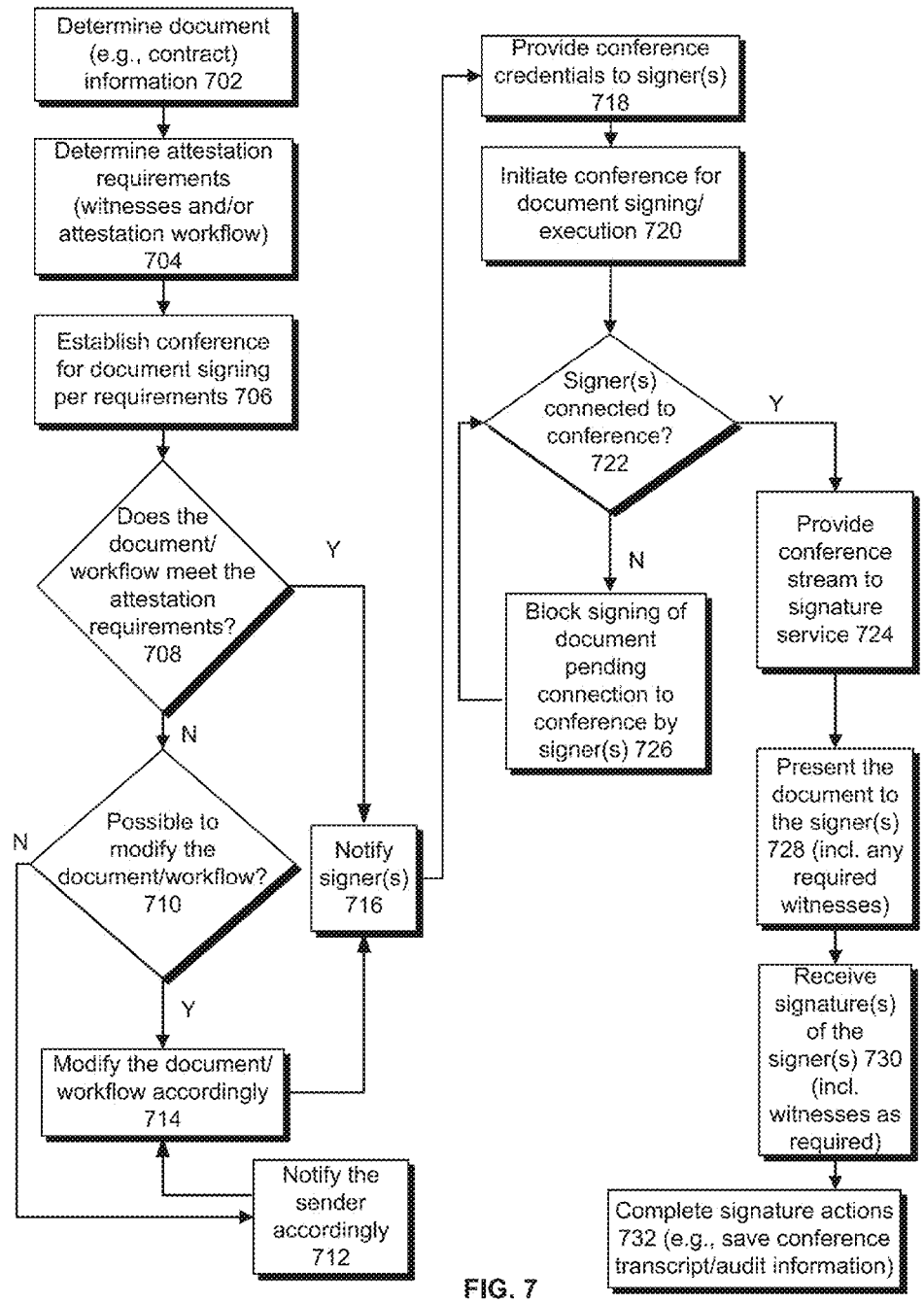
FIG. 7 is a flowchart illustrating an exemplary method for collecting signatures in a document that meets various attestation requirements, in accordance with embodiments.

FIG. 5 illustrates an example flow that the electronic signature service may implement to generate a document that meets various attestation requirements, and to modify a document and/or a workflow in accordance with attestation requirements. Operations of the example flow of FIG. 5 may be further embodied in operations of the example flows of FIGS. 6, 7, and 8. As such, some operations of the example flows of FIGS. 5, 6, 7, and 8 may be similar. Such similarities are not repeated herein in the interest of clarity of explanation. FIG. 6 illustrates an example flow for generating a document that meets various attestation requirements. FIG. 7 is a flowchart illustrating an exemplary method for collecting signatures in a document that meets various attestation requirements. An example flow for determining that users requested to electronically sign a document are connected to a conference is shown in and described with respect to FIG. 8. Further, while the operations in the example flows are performed, the electronic signature service may store information descriptive of circumstances associated with performing the operations (e.g., changes made to a contract and associated times, identifiers of the software tools used, and other circumstances). This information may be stored as an audit trail.

In the interest of clarity of explanation, an example use case is described in the flows of FIGS. 5, 6, and 7, where a sender 102 requests that a signer 122 sign an electronic document, and the signing of the document needs to be witnessed by witness 136 in accordance with attestation requirements. However, the example flows are not limited to this use case. Instead, the electronic signature service may implement the example flows for other and different numbers of users and requirements.

With reference to FIG. 5, the example flow starts at operation 502, where the electronic signature service 130 may receive document and/or workflow information. For example, a sender 102 may operate a computing device 104 to remotely log-in and use one or more services of the electronic signature service 130. The electronic signature service 130 may facilitate these services by way of one or more interfaces. The sender 102 may use an interface to upload an already created document or to create a document to be signed. Similarly, the sender 102 may use the interface to specify the workflow associated with the document.

At operation 504, the electronic signature service 130 may determine attestation requirements and other requirements associated with a document. For example, as shown in FIG. 5, the electronic signature service may determine a witness 136 and other information. The determination of attestation requirements can be based in part on requirements of the sender 102, a location of a signer 122, and/or an organizational affiliation of the signer 122.

The electronic signature service may present an interface to the sender 102 that, in turn, may use the interface to input attestation requirements. In another example, the sender 102 may login to the electronic signature service 130 using an identifier (e.g., a user name, an email address, or other identifiers) and may identify the signer 122 (e.g., using a user name, an email address, or other identifiers of the signer) and a witness 136 (e.g., using a user name, an email address, or other identifiers of the witness). In turn, the electronic signature service 130 may use the identifiers to query and retrieve from one or more databases (e.g. a sender database 412, a signer database 414, and a witness database 424) information needed to send document information 126 and conference credentials 156 to the signer 122 and the witness 136 (e.g., the respective email addresses). In yet another example, if the sender, signer, and/or witness are not pre-registered with the electronic signature service (e.g., no corresponding profiles are stored in the sender database 412, the signer database 414, and/or the witness database 424), the electronic signature service 130 may determine the computing devices that the sender, signer, and witness operate (e.g., using information about the computing devices received via a communications network). In a further example, the electronic signature service 130 may parse the document to determine one or more of the signer 122 and the witness 136. For example, if the document includes a signature block describing a notary, the electronic signature service may use that notary as the witness 136.

At operation 504, the electronic signature service 130 may also determine other applicable requirements. These requirements may include attestation requirements and other requirements beyond those specified by the sender 102. The electronic signature service 130 may use location or organization information received at operation 502 to determine additional attestation requirements. For example, the electronic signature service 130 may use the location information to query and retrieve from one or more databases (e.g., a proceedings database 422 and/or a witness database 424) proceedings recording and witnessing requirements that may apply for each location or organization, where the requirements may specify required document language, types of signatures, and/or workflow actions. Similarly, the electronic signature service 130 may use information about the sender 102 and/or signer 122 determined as part of operation 504 (e.g., identifiers of the sender, signer, and witness) to determine user-specific requirements. The electronic signature service 130 may determine whether there are any conflicts between the applicable requirements. If so, the electronic signature service may notify the sender 102, signer 122, and/or witness 136 accordingly. This may include sending a communication (e.g., an email) to the sender, signer, or witness with information descriptive of the conflicts. Otherwise, the electronic signature service 130 may unify the requirements into a rule set that may be applied to the document and/or workflow. In the use case example, the rule set may require the document to include positive assent language, the signature field of the signer 122 to accept only a digital signature generated with a digital certificate and witnessed by witness 136, and a copy of the signed document to be associated with recorded proceedings of a conference used by the signer 122 and witness 136 for signing the document.

At operation 506, the electronic signature service 130 may modify the document and/or the workflow using the applicable requirements. More particularly, the electronic signature service 130 may apply the rule set to the document and/or the workflow such that the document and/or the workflow meet the applicable attestation requirements. The electronic signature service may perform such modifications automatically or may require approval from the sender 102. As explained herein above, the sender 102 may specify in the workflow a pre-authorization for the electronic signature service to perform certain modifications and not others as well as notification requirements. As such, for required modifications that are pre-authorized, the electronic signature service may automatically modify the document and/or the workflow and may notify the sender accordingly. For required modifications that are not pre-authorized, the electronic signature service may present descriptions of these modifications to the sender and may receive corresponding approval or further edits from the sender 102. In an example use case where the document is a contract, if the electronic signature service 130 determines that required positive assent language is already in the contract but that the workflow does not specify that the witness 136 is to witness that the signer 122 populates the signature field as stipulated by an attestation requirement, the electronic signature service 130 may modify the contract to include a required witness signature field configured to accept a digital signature of the witness 136 and modify the workflow to require that the witness 136 witness the signer's 122 signature.

At operation 508, a conference for signing the document is established in accordance with the requirements determined at operation 504. As shown in FIG. 5, operation 508 can comprise providing conference credentials 156 to users such as the signer 122 and the witness 136 for a conference hosted by conference platform 140. In embodiments, the conference can be one or more of a web-based conference, a video conference, and an audio conference. For example, the conference can be a web-based conference that includes streamed audiovisual components such a shared desktop, a chat room functionality, an Internet relay chat, and/or an instant message (IM) component.

At operation 510, the electronic signature service may receive signatures to the modified document. For example, the electronic signature service may present a modified document to the sender and the signer by way of respective interfaces. In turn, the sender and the signer may use the respective interfaces to sign the document. For example, the sender 102 may input an electronic signature in a signature field of the sender. Similarly, the signer 122 may input an electronic signature in the signature field of the signer and the witness 136 may input an electronic signature in the signature field of the witness. In one example, the electronic signature may only allow the signer 122 to input a digital signature using a digital certificate issued by a certificate authority indicated in the attestation requirements. Otherwise, the electronic signature service 130 may reject the electronic signature of the signer 122. When the document is signed, the electronic signature service 130 may associate a copy of the signed document with conference information 146.

Turning to FIG. 6, that figure illustrates an example flow for generating a document that meets various attestation requirements. For example, in cases where the document is a contract and the sender 102 is a party to the contract, attestation requirements specified by the sender 102 are considered in the example flow of FIG. 6. In turn, the electronic signature service may use the identifiers to retrieve account information for the sender and signer from a user database. The account information can include the relevant organizations and/or locations. In yet another example, the electronic signature may derive the relevant organization and/or locations directly from the contract. For instance, the electronic signature service may parse the contract for clauses and keywords specifying organization and/or location information (e.g., a clause indicating organizational affiliations of the sender and signer, addresses of the sender and signer or a clause describing governing law jurisdictions, etc.).

The example flow of FIG. 6 starts at operation 602, where an electronic signature service may receive document and/or workflow information. This operation may be similar to operation 502 described above with reference to FIG. 5. As shown in FIG. 6, operation 602 can comprise receiving contract information when the document to be signed is a contract. In an example, a sender may operate a computing device to connect to the electronic signature service. In turn, the electronic signature service may provide an interface to the sender usable for various actions. For example, the sender may use the interface to log-in to a sender account, to upload a created contract in a certain format (e.g., a WORD or a PDF document), to identify a signer, to identify a witness, to specify an organization or location where the contract may be relevant, and to identify aspects of the workflow (e.g., whether the electronic signature service may automatically modify the contract, whether the electronic signature service should notify the sender when a modification needs to be made, and other workflow actions).

At operation 604, the electronic signature service may determine attestation requirements. As shown, the attestation requirements can include witness requirements for signer(s) in certain organizations or jurisdictions, and/or a specified document execution time frame). This operation may be similar to operation 504.

At operation 606, in coordination with the electronic signature service, the conference platform can establish a conference to be used for witnessing signing of the document. As depicted in FIG. 6, operation 606 can comprise providing conference credentials to signer(s) and any witnesses designated by attestation requirements. This operation may be similar to operation 506.

At operation 608, the electronic signature service may determine whether the document and/or workflow meet the attestation requirements. If so, the document and the workflow need not be modified and, thus, the electronic signature service may perform actions of the workflow and may notify the sender of the document as further described at operation 616. Otherwise, the document and/or workflow should be modified to meet the attestation requirements. In this case, control is passed to operation 610.

At operation 610, the electronic signature service may determine whether the document and/or the workflow may be modified. For example, by comparing the document and/or workflow to the rule set, the electronic signature service may identify the required changes to the document and/or workflow. In turn, the electronic signature service may compare the required changes to what the sender has pre-authorized (e.g., based on what the sender specified at operation 602). If it is possible to automatically perform the required changes (e.g., when the electronic signature service is pre-authorized), control is passed to operation. Otherwise, control is passed to operation 612, where the electronic signature service notifies the sender of the required changes. The notifications resulting from operation 612 may be in the form of an electronic communication sent to the sender and containing information descriptive of the required changes (e.g., an email with the information or with a link to a web page hosted by the electronic signature service for providing the information). In turn, the sender may approve the required changes or may manually edit the document and/or workflow with the required changes. At that point, control is passed to operation 614. Otherwise, the required changes cannot be made and the electronic signature service may block signing of the document or may return the document to the sender.

At operation 614, the electronic signature service may modify the document and/or the workflow based on the required changes. For example, if the document does not include a proper signature field for the signer and/or the witness, and/or if the workflow does not specify that a copy of the signed document should be associated with conference information as stipulated by an attestation requirement, the electronic signature service may update the document and/or workflow accordingly.

Once the document and/or workflow meet the attestation requirements associated with the sender, the signer, and the witness, the workflow may be ready for execution and the document may be ready for presentation to the signer and the witness. At that point, operation 616 may be performed, where the electronic signature service may notify the signer of the document. For example, the electronic signature service may send an electronic communication to the signer (e.g., an email to an email address of the signer retrieved from the signer account). The electronic communication may inform the signer and a witness that a document such as a contract is available for signing and may provide a link to a web page that the electronic signature service hosts and that presents the contract. In this case, the signer may operate a computing device to connect to the electronic signature service to review and sign the contract as described at operations 618-620. Additionally or alternatively, the electronic communication may contain a copy of the document to be signed and witnessed. In this case, the signer may still use the electronic signature service to sign the document or may sign the contract separately from the electronic signature service.

At operation 618, the electronic signature service may authenticate the signer. In an example, the signer may operate the computing device to follow the link to a web page associated with the document, which may require an authentication of the signer. In response to the signer entering credentials (e.g., user name and password), the electronic signature service may authenticate the signer and connect the computing device to the web page. In another example, the signer need not follow the link. Instead, the signer may operate the computing device to connect as a guest at the electronic signature service, search for and find the document, enter a code provided in the electronic communication, and access the document. In yet another example, operation 618 can comprise authenticating the signer to a conference using conference credentials. The conference can be a conference accessible by the signer and any witness(es) designated in the attestation requirements. The authentication performed in operation 618 can use a web cam and comprise a workflow sequence where the signer has to present identification to the witness beyond the conference or web page credentials. For example the identification can be a photo ID or government-issued ID as required by a notary witness. In this example, the witness can pause the workflow so as to block signing of the document until the signer furnishes the required identification.

At operation 620, the electronic signature service may present the document to one or more signers. For example, the electronic signature service may present the document at a web page, within an electronic conference session, or at an interface that the signer is able to connect to by way of the computing device.

At operation 622, the electronic signature service may receive a signature of the signer. For example, the signer may input a signature in a signature field of the document. In an example, the electronic signature service may block or reject any signature from the signer that has not been witnessed as per an attestation requirement. In other words, the electronic signature service may inform the signer of the type of acceptable signature and witnessing requirements and may only allow the signer to input a signature in the signature field that meets the acceptable signature type and is being witnessed as stipulated by an attestation requirement.

At operation 624, the electronic signature service may complete any other signature actions. This may include performing remaining actions of the workflow. For example, the electronic signature service may notify the sender of the signer's witnessed signature, may receive the witness's electronic seal or signature, and may save a copy of the signed document along with audit information. For example, the workflow may require an audit trail to be generated and various records thereof to be distributed. For instance, the attestation requirements may specify that an audit trail be stored at a server along with a record of electronic conference proceedings. As each of the operations 602-624 is performed, the electronic signature service may store information descriptive of contexts and circumstances for performing the operations as a record or metadata of an audit trail, and may complete the workflow. As such, the electronic signature service may store a copy of the audit trail at a server and may save a copy of the record indicating the signer's and the witness's signatures along with a record of associated electronic conference proceedings.

Hence, by performing the example flow of FIG. 6, the electronic signature service may receive information about a document and relevant attestation requirements from the sender. In turn, the electronic signature service may determine the various additional attestation requirements based on organizations and locations the sender and signer are associated with. If agreed to (e.g., pre-authorized or authorized post notification), the electronic signature service can automatically update the document and the workflow based on these requirements. Also, the electronic signature service may perform the various actions of the workflow including receiving the required signatures, storing various records associated with the document, and distributing the various records of conference proceedings to required parties and entities.

Turning to FIG. 7, that figure illustrates an example flow for collecting signatures in a document that meets various attestation requirements. In this example flow, the modification of the document and/or workflow can be done in two phases. In a first phase, the document and/or workflow can be modified based on attestation requirements. In a second phase, a signer can be temporarily blocked from signing a document until all required parties (e.g., other signers and any witnesses) have connected to an electronic conference session.

The example flow of FIG. 7 starts at operation 702, where an electronic signature service may determine document information. This operation may be similar to operation 602.

At operation 704, the electronic signature service may determine attestation requirements, such as the requirements for any witnessing of signatures to be collected. As shown in FIG. 7, operation 704 can also comprise determining steps of an attestation workflow necessary to fulfill the attestation requirements. This operation may be similar to the operation 604.

At operation 706, the electronic signature service may coordinate with a conferencing platform to establish an electronic conference session for document signing. This operation may be similar to the operation 606.

At operation 708, the electronic signature service may determine whether the document and/or the workflow meet the attestation requirements. This operation may be similar to the operation 608. If the document and/or workflow meet the requirements, control is passed to operation 716 where the electronic signature service may notify the signer of the document. Otherwise, control is passed to operation 710.

At operation 710, the electronic signature service may determine whether the document and/or workflow can be modified to meet the attestation requirements. This operation may be similar to the operation 610. If the document and/or workflow cannot be modified, control is passed to operation 712. Otherwise, control is passed to operation 714.

At operation 712, the electronic signature service may notify the sender of the required changes. This operation may be similar to the operation 612. If the sender approves the required changes or edits the document and/or workflow based on the required changes, the electronic signature service may modify the document and/or workflow accordingly at operation 714. Otherwise, the electronic signature service may cancel or return the document to the sender.

At operation 714, the electronic signature service may update the document and/or workflow based on the required changes. This operation may be similar to the operation 614. At this point in the flow, the document and the workflow may meet the requirements associated with the sender's organization and/or location and any other specified organization and/or location but not the requirements associated with the signer's organization and/or location because this organization and/or location and, thus, the corresponding attestation requirements may not yet be known.

At operation 716, the electronic signature service may notify one or more signers and witnesses of the document. This operation may be similar to the operation 616. In an example, the electronic signature service may send an electronic communication (e.g., an email) to an address (e.g., an email address) of the signer(s) and any designated witness (es). This address may have been provided by the sender at the operation 702. The electronic communication may include information descriptive of the document and a link to a web page associated with the document and hosted by the electronic signature service.

At operation 718, a conference provider may provide, via a conferencing platform, conference credentials to one or more signers. The credentials may include a conference login ID and password/passcode, and may be sent with information descriptive of the conference such as a start time, title/subject, list of participants such as signers and witnesses, and a link to a web page associated with the document to be signed. The conference may be hosted the conference platform in conjunction with the electronic signature service.

At operation 720, the conference is initiated by the conferencing platform and control is passed to operation 722 where it is determined if the signers are connected to the conference. If the required signers are not yet connected to the conference, control is passed to operation 726. Otherwise, control is passed to operation 724 where a stream of the conference is provided to the electronic signature service.

At operation 726, signing of the document is blocked or prevented pending connection to the conference by signers. Operation 726 can comprise pausing the document signing workflow until all required signers and witnesses have authenticated to the conference and are present in the conference session. In additional or alternative embodiments, operation 726 can enforce an attestation requirement mandating that a required subset of participants are connected to the conference session when the document is signed without requiring all participants to be connected to the conference.

At operation 728, the electronic signature service may present the document to the signers and witnesses. For example, the electronic signature service may present the document within the electronic conference session.

At operation 730, the electronic signature service may receive signatures of the signers. For example, the signers may input respective signatures in respective signature fields of the document. In an example, the electronic signature service may block a signature from a signer that has not been witnessed as per an attestation requirement. That is, the electronic signature service may inform the signer of the witnessing requirements and may only allow the signer to input a signature in a signature field when the act of signing is being witnessed by a witness connected to the conference session as stipulated by an attestation requirement.

At operation 732, the electronic signature service may complete any other signature actions. This may include performing remaining actions of the workflow. For example, the electronic signature service may notify the sender of the signer's witnessed signature, may receive the witness's electronic seal or signature, and may save a copy of the signed document along with audit information. For example, the workflow may require an audit trail to be generated and various records thereof to be distributed. For instance, the attestation requirements may specify that an audit trail be stored at a server along with a record of electronic conference proceedings. As each of the operations 702-732 is performed, the electronic signature service may coordinate with the conferencing platform to store information descriptive of contexts and circumstances for performing the operations as a record or metadata of an audit trail, and may complete the workflow. As such, the electronic signature service may store a copy of the audit trail at a server and may save a copy of the record indicating the signers' and the witnesses' signatures along with a record of associated electronic conference proceedings.

Figure 8:
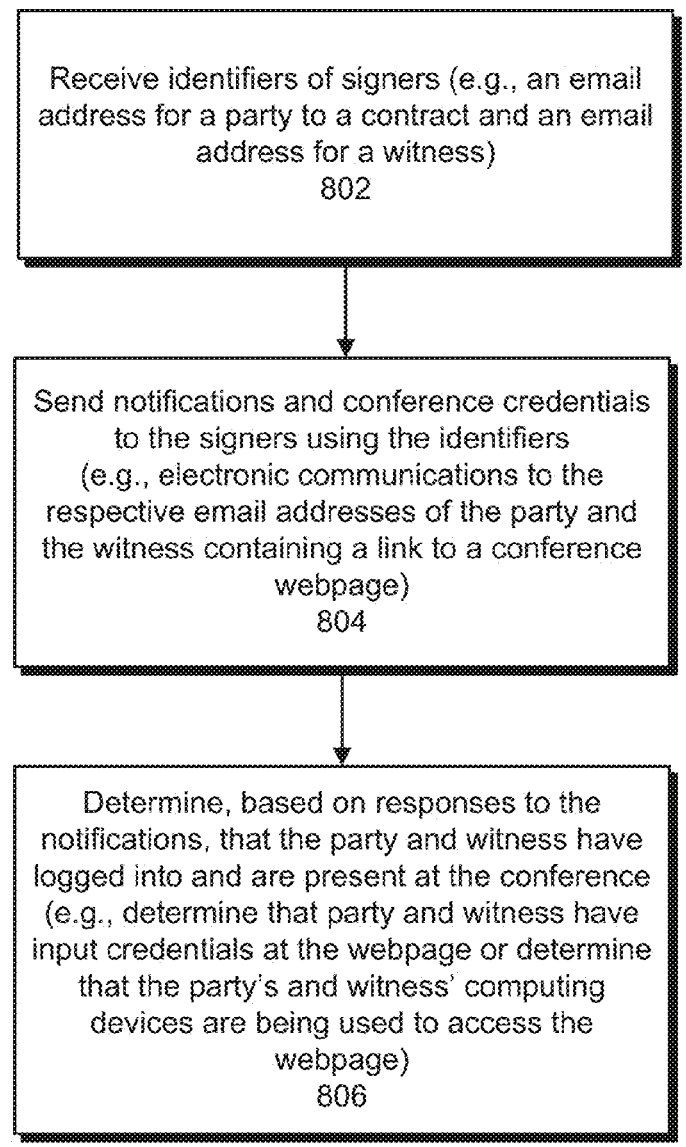
FIG. 8 illustrates an example flow for determining that users requested to electronically sign a document are connected to a conference, in accordance with embodiments.

An example flow for determining that users requested to electronically sign a document are connected to a conference is illustrated in FIG. 8. The electronic signature service may perform operations 702-720 described above with reference to FIG. 7 before presenting the document to the signers.

At operation 802, the electronic signature service may receive identifiers of signers and designated witnesses. As shown in the example embodiment of FIG. 8, the identifiers can include email addresses for a party to a contract and an email address for a witness that is required to witness the execution of the contract by the party.

At operation 804, the electronic signature service may send notifications and conference credentials to the signers, as well as any designated witnesses, using the identifiers. As depicted in FIG. 8, operation 804 can comprise sending electronic communications to the respective email addresses of the party and the witness containing a link to a conference webpage.

At operation 806, the electronic signature service may determine, based on responses to the notifications resulting from operation 804, that the party and witness have logged into the conference. Operation 806 can also comprise determining that the party and the witness are currently present at the conference (e.g., they have not disconnected from the conference, have not left the conference, or they are otherwise actively participating in the conference). As illustrated in FIG. 8, operation 806 can be performed by determining whether the party to the contract and the witness have furnished the conference credentials at the webpage. As shown, operation 806 can further comprise determining that the party's and witness' computing devices are currently being used to access the webpage.

Exemplary Computer System Implementation

Figure 9:
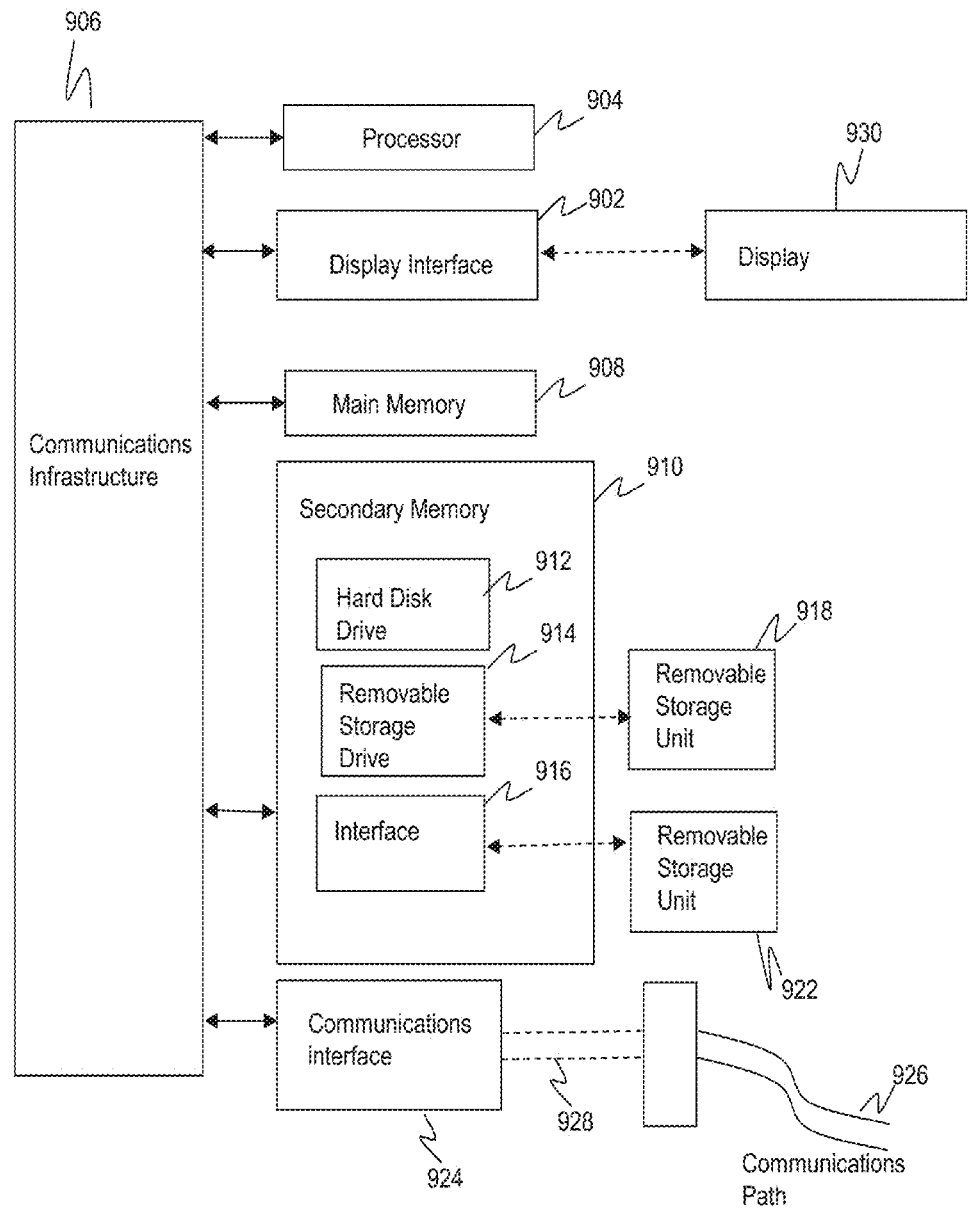
FIG. 9 is a diagram of an exemplary computer system in which embodiments of the present disclosure can be implemented.

Although exemplary embodiments have been described in terms of apparatuses, systems, services, and methods, it is contemplated that certain functionality described herein may be implemented in software on microprocessors, such as a microprocessor chip included in computing devices such as the computer system 900 illustrated in FIG. 9. In various embodiments, one or more of the functions of the various components may be implemented in software that controls a computing device, such as computer system 900, which is described below with reference to FIG. 9.

To implement the various features and functions described above, some or all elements of the computing devices (e.g., computing devices 104, 124, and 144) and servers (e.g., servers 134 and 154) may be implemented using elements of the computer system of FIG. 9. More particularly, FIG. 9 illustrates an example computer system 900 for implementing the techniques in accordance with the present disclosure.

Aspects of the present invention shown in FIG. 1-8, or any part(s) or function(s) thereof, may be implemented using hardware, software modules, firmware, tangible computer readable media having logic or instructions stored thereon, or a combination thereof and may be implemented in one or more computer systems or other processing systems.

FIG. 9 illustrates an example computer system 900 in which embodiments of the present invention, or portions thereof, may be implemented as computer-readable instructions or code. For example, some functionality performed by the computing devices 104, 124, and 144 and servers 134 and 154 shown in FIG. 2 can be implemented in the computer system 900 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the workflow 300 illustrated by FIG. 3 discussed above. Similarly, hardware, software, or any combination of such may embody certain modules and components used to implement steps in the flowcharts illustrated by FIGS. 5-8 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme. In certain embodiments, a processor of one or more of the computing devices 104, 124, and 144 and servers 134 and 154 described above with reference to FIG. 1 can be embodied as the processor device 904 shown in FIG. 9.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. In non-limiting embodiments, one or more of the memories of computing devices 104, 124, and 144 and servers 134 and 154 of FIG. 2 can be embodied as the main memory 908 shown in FIG. 9.

The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a non-transitory computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or EEPROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 908 and secondary memory 910, which can be memory semiconductors (e.g., DRAMs, etc.). Computer readable medium and non-transitory computer readable medium can also refer to removable storage unit 918, removable storage unit 922, and a hard disk installed in hard disk drive 912. Signals carried over communications path 926 can also embody the logic described herein. These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the steps in the methods illustrated by the flowcharts of FIGS. 5-8, discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

In an embodiment, display devices used to display interfaces of computing devices 104, 124, and 144, and servers 134 and 154 may be a computer display 930 shown in FIG. 9. The computer display 930 of computer system 900 can be implemented as a touch sensitive display (i.e., a touch screen). For example, the computer display 930 can be used to display components of a conferencing session, such as a video component, a shared desktop interface, and a chat window. Also, for example, computer display 930 can be used to display an electronic document to be signed and any attachments and supporting documentation.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
   determining, by a computing service hosted on a computing system, one or more attestation requirements for electronic signatures to be applied to an electronic document and identifiers of users associated with the electronic signatures;
   modifying, by the computing service, the electronic document based on the one or more requirements;
   generating, by the computing service, conference credentials for an electronic conference based on the one or more requirements, the electronic conference to be established for receiving the electronic signatures;
   setting, by the computing service, a state of the electronic document to un-signable;
   initiating, by the computing service, the electronic conference;
   providing, by the computing service over a computer network, the electronic document in the un-signable state and the conference credentials to electronic addresses of the users based on the identifiers of the users;

determining, by the computing service, that the users have logged into the electronic conference based on the conference credentials;

changing, by the computing service, the state of the electronic document from un-signable to signable after determining that the users have logged into the electronic conference;

during the electronic conference, receiving, by the computing service from the computing devices of the users over the computer network, the electronic signatures after the state of the electronic document is changed to signable; and storing, by the computing service, in a data storage space the electronic document with the electronic signatures.

2. The computer-implemented method of claim 1, wherein the one or more requirements comprise a requirement to record an aspect of the electronic signing of the electronic document by the users, wherein the computing service facilitates recording of the aspect and only permits the electronic signing by the users when the requirement to record the aspect of the electronic signing is satisfied by the recording.

3. The computer-implemented method of claim 1, wherein the providing comprises:

providing, to the one or more users, conference information to sign the electronic document, wherein the conference information includes a proposed time for signing the electronic document.

4. The computer-implemented method of claim 1, further comprising:

receiving, by the computing service, a notification that a computing device of a user previously connected to the electronic conference established as part of a workflow for signing the document has disconnected from the electronic conference; and in response to receiving the notification, suspending, by the computing service, the workflow until the computing device of the user is re-connected to the electronic conference.

5. The computer-implemented method of claim 1, the method further comprising:

recording, by the computing service, conference proceedings of the electronic conference to at least partially satisfy the one or more requirements, the conference proceedings including information about receiving the electronic signatures to the electronic document from the computing devices of the users after the users have been logged in and during the electronic conference;

generating, by the computing service, an audit trail that comprises the information of the conference proceedings; and adding, by the computing service, the audit trail as metadata to the electronic document.

6. The computer-implemented method of claim 1, the method further comprising:

in response to determining that the users have electronically signed the electronic document:

associating recorded conference proceedings with the electronic signatures in the electronic document; and saving the recorded proceedings and the electronic signatures as audit information.

7. The computer-implemented method of claim 1, wherein the providing comprises:

providing the electronic document to a computing device of a user required to electronically sign the electronic document; and providing the document to a computing device of a witness required to verify an identity of the user in accordance with the one or more requirements.

8. The computer-implemented method of claim 1, wherein:

the one or more requirements are determined by the computing service based at least in part on geographic locations of the computing devices of the users; and the one or more requirements include witness requirements associated with the geographic locations.

9. The computer-implemented method of claim 1, wherein:

the one or more requirements are determined by the computing service based at least in part on one or more organizations that the users are associated with; and the one or more requirements include witness requirements of the one or more organizations.

10. The computer-implemented method of claim 1, wherein:

the users include a signer of the electronic document;

the one or more requirements include a time frame during which the electronic document is to be electronically signed; and the modifying is performed by the computing service prior to the time frame.

11. The computer-implemented method of claim 1, wherein the electronic conference includes one or more of: a video component, an audio component, a chat window component, and a shared interface component.

12. A system comprising:

a processor; and a memory having executable instructions stored thereon, that, if executed by the processor, cause the system to perform operations comprising:

determining one or more attestation requirements for electronic signatures to be applied to an electronic document and identifiers of users associated with the electronic signatures;

modifying the electronic document based on the one or more requirements;

generating conference credentials for an electronic conference based on the one or more requirements, the electronic conference to be established for receiving the electronic signatures;

setting a state of the electronic document to un-signable;

initiating the electronic conference;

providing, over a computer network, the electronic document in the un-signable state and the conference credentials to electronic addresses of the users based on the identifiers of the users;

determining that the users have logged into the electronic conference based on the conference credentials;

modifying the state of the electronic document from un-signable to signable after determining that the users have logged into the electronic conference;

during the electronic conference receiving, from the computing devices of the users over a computer network, electronic signatures of the users to the electronic document after the state of the electronic document is modified to signable; and storing in a data storage space the electronic document with the electronic signatures.

13. The system of claim 12, wherein:
the electronic document is a contract;
a requirement of the one or more requirements designates an entity not a party to the contract as a witness; and
only the entity and a corresponding one of the users need to connect to a conference hosted by the system in order to initiate signing of the document.

14. The system of claim 12, the operations further comprising, prior to the providing:
preventing, based on the state of the electronic document being un-signable, the users from electronically signing the document until an entity performs an action, wherein the entity and the action are designated by the one or more requirements.

15. The system of claim 14, wherein the action includes confirming that the users have presented an acceptable form of identification, and wherein the acceptable form of identification is defined by the one or more requirements.

16. A non-transitory computer readable storage medium having executable instructions stored thereon, that, if executed by a computing device, cause the computing device to perform operations comprising:
determining one or more attestation requirements for electronic signatures to be applied to an electronic document and identifiers of users associated with the electronic signatures;
modifying the electronic document based on the one or more requirements;
generating conference credentials for an electronic conference based on the one or more requirements, the electronic conference to be established for receiving the electronic signatures;
setting a state of the electronic document to un-signable;
initiating the electronic conference;
providing, over a computer network, the electronic document in the un-signable state and the conference credentials to electronic addresses of the users based on the identifiers of the users;
determining that the users have logged into the electronic conference based on the conference credentials;
modifying the state of the electronic document from un-signable to signable after determining that the users have logged into the electronic conference based on the conference credentials;
during the electronic conference receiving, from the computing devices of the users over the computer network, electronic signatures of the users to the electronic document after the state of the electronic document is modified to signable; and
storing in a data storage space the electronic document with the electronic signatures.

17. The computer readable storage medium of claim 16, wherein the providing comprises providing, to computing devices of the users, conference information to sign the electronic document, wherein the conference information includes a proposed time frame for signing the electronic document.

18. The computer readable storage medium of claim 16, wherein the operations further comprise:
receiving a notification that a user previously connected to the electronic conference established as part of a signature process for the electronic document has disconnected from the electronic conference; and
in response to receiving the notification, suspending the signature process until the computer device of the user is connected again to the electronic conference.

19. The computer readable storage medium of claim 16, wherein the providing comprises:
providing the electronic document to a computing device of a user required to electronically sign the document; and
providing the electronic document to a computing device of a witness required to verify an identity of the user in accordance with the one or more requirements.

* * * * *